(12) United States Patent
Ishihara

(10) Patent No.: US 7,538,775 B2
(45) Date of Patent: May 26, 2009

(54) STORAGE MEDIUM STORING GAME PROGRAM AND GAME APPARATUS

(75) Inventor: Susumu Ishihara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 401 days.

(21) Appl. No.: 11/637,669

(22) Filed: Dec. 13, 2006

(65) Prior Publication Data

US 2008/0043022 A1 Feb. 21, 2008

(30) Foreign Application Priority Data

Aug. 18, 2006 (JP) ............................... 2006-223287

(51) Int. Cl.
  *A63F 9/24* (2006.01)
  *A63F 13/00* (2006.01)
  *G06T 17/00* (2006.01)
  *G06T 15/10* (2006.01)
  *G06F 3/00* (2006.01)
  *G09G 5/36* (2006.01)
  *G09G 5/00* (2006.01)
  G09G 5/377 (2006.01)
  G06T 17/40 (2006.01)
  A63F 13/02 (2006.01)
  A63F 13/04 (2006.01)

(52) U.S. Cl. ...................... 345/592; 345/419; 345/581; 345/547; 463/30; 463/32; 463/43; 715/706; 715/757

(58) Field of Classification Search ......... 345/418–419, 345/428, 427, 581, 586, 592, 657, 547, 628, 345/622, 551, 653; 463/1, 30–32, 37, 43, 463/51; 715/706, 757, 763, 848, 781–782, 715/850

See application file for complete search history.

(56) References Cited

U.S. PATENT DOCUMENTS

| 2001/0000014 A1* | 3/2001 | Ishihara et al. ........... 273/317.6 |
| 2003/0186741 A1* | 10/2003 | Hayashida et al. ............ 463/31 |
| 2005/0079914 A1* | 4/2005 | Kaido et al. .................. 463/30 |
| 2005/0116964 A1* | 6/2005 | Kotake et al. ............... 345/629 |
| 2005/0202868 A1* | 9/2005 | Sawano et al. ................ 463/30 |
| 2005/0272506 A1* | 12/2005 | Sumi ........................... 463/51 |
| 2006/0170652 A1* | 8/2006 | Bannai et al. ............... 345/156 |

FOREIGN PATENT DOCUMENTS

| JP | 09-50541 | 2/1997 |
| JP | 09-299613 | 11/1997 |
| JP | 11-42370 | 2/1999 |
| JP | 2002-197486 | 7/2002 |

* cited by examiner

Primary Examiner—Wesner Sajous
(74) Attorney, Agent, or Firm—Nixon & Vanderhye P.C.

(57) ABSTRACT

A relative position of each object with respect to a point of view is changed by changing at least one of information indicating a position of the point of view and information indicating a position of the object, the pieces of information being stored in a storage section. It is determined whether or not a distance from the point of view to each object in a virtual space is smaller than or equal to a predetermined distance, with reference to the information indicating the point of view and the information indicating the position of the object. Next, information indicating a transparency of an object whose distance is determined to be smaller than or equal to the predetermined distance is updated every a unit time so that the transparency of the object is gradually increased. A virtual image including the object is drawn with reference to the information indicating the transparency.

8 Claims, 17 Drawing Sheets

2

STORAGE MEDIUM STORING GAME PROGRAM AND GAME APPARATUS

CROSS REFERENCE TO RELATED APPLICATION

The disclosure of Japanese Patent Application No. 2006-223287, filed Aug. 18, 2006, is incorporated herein by reference.

BACKGROUND OF THE INVENTION

1. Field of the Invention

The present invention relates to a storage medium storing a game program for displaying on a screen of a display device a virtual image obtained when at least one object existing in a virtual space is observed from a predetermined point of view in the virtual space, and a game apparatus.

2. Description of the Background Art

In recent years, as the performance of computers included in game systems is increased, three-dimensional games employing three-dimensional computer graphics technology are becoming popular. In the three-dimensional game, an object composed of polygons, such as a character object, a building object or the like, is provided in a three-dimensional game space, and what is seen from a predetermined point of view in the game space is displayed as a three-dimensional game screen. In most cases, the predetermined point of view is directed to a player character object (hereinafter simply referred to as a player character) so as to cause a player to recognize the player character which is operated by the player. In this case, since the predetermined point of view is moved while keeping a predetermined positional relationship with the player character, an obstacle may get in the way of line of sight on which the player character is observed. Therefore, there is a disclosed technique of causing the obstacle to become transparent or translucent in such a case.

For example, there is a disclosed image generating apparatus (e.g., Japanese Laid-Open Patent Publication No. 9-50541) in which it is determined whether or not an obstacle conceals a player character as viewed from the predetermined point of view, and when it is determined that the obstacle conceals the player character, a process of causing the obstacle to become transparent is performed. Also, there is a disclosed game apparatus (e.g., Japanese Laid-Open Patent Publication No. 9-299613) in which, when a player character is concealed by a wall or a floor in a game space, the wall or floor is caused to become transparent. Also, there is a game apparatus (e.g., Japanese Laid-Open Patent Publication No. 2002-197486) in which a game space is divided into a plurality of regions, depending on a distance in a depth direction from the predetermined point of view, an opacity is set for each divided region, and translucency synthesis is performed with respect to each pixel included in each region using the opacity. Also, there is a disclosed game apparatus (e.g., Japanese Laid-Open Patent Publication No. 11-42370) in which a transparency of each pixel is set, depending on a distance from the predetermined point of view to each pixel (dot) unit of each object.

However, the apparatuses as disclosed in the above-described documents conventionally have the following problems. In the apparatuses disclosed in Japanese Laid-Open Patent Publication Nos. 9-50541 and 9-299613 described above, when a player character gets concealed by an obstacle, the obstacle is caused to instantaneously become transparent. Therefore, since the obstacle so far seen suddenly disappears, the player feels awkward or unnatural. In the game apparatuses disclosed in Japanese Laid-Open Patent Publication Nos. 2002-197486 and 11-42370, since the transparency is changed depending on the distance from the predetermined point of view, the transparency is gradually changed as long as the obstacle gradually moves closer or away, thereby making it possible to significantly reduce the sense of awkwardness or unnaturalness which the player feels. However, for example, when an obstacle suddenly appears on a screen (before the player's eyes) upon switching of screens, the obstacle is caused to instantaneously become transparent (or translucent). Therefore, the obstacle appears for a moment and immediately disappears, which causes the player to feel awkward or unnatural.

SUMMARY OF THE INVENTION

Therefore, an object of the present invention is to provide a storage medium storing a game program which can prevent the sight of a player from being obstructed by an object while preventing the player from feeling awkward or unnatural due to sudden disappearance of the object which obstructed the sight of the player, and a game apparatus.

The present invention has the following features to attain the object mentioned above. Note that reference numerals, additional descriptions and the like inside parentheses indicate exemplary correspondence to embodiments described below for the sake of easy understanding, and do not limit the present invention.

A first aspect of the present invention is directed to a storage medium storing a game program for displaying on a screen of a display device a virtual image obtained when at least one object present in a virtual space is observed from a predetermined point of view in the virtual space, the game program causing a computer of a game apparatus to execute a relative position changing step (S6), a distance determining step (S22), a transparency changing step (S33), and a drawing step (S9). The relative position changing step changes a relative position of each object with respect to the point of view by changing at least one of information indicating a position of the point of view and information indicating a position of the object, the pieces of information being stored in a storage means of the game apparatus. The distance determining step determines whether or not a distance from the point of view to each object in the virtual space is smaller than or equal to a predetermined distance, with reference to the information indicating the point of view and the information indicating the position of the object. The transparency changing step changes, every a unit time, information indicating a transparency of an object whose distance is determined in the distance determining step to be smaller than or equal to the predetermined distance, so that the transparency of the object is gradually increased, the information indicating the transparency of the object being stored in the storage means of the game apparatus. The drawing step draws a virtual image including the object with reference to the information indicating the transparency.

In a second aspect based the first aspect, the distance determining step includes determining whether or not at least a portion of a bounding region for each object, the bounding region enclosing the object, is positioned closer to the point of view than a boundary surface is, the boundary surface being set at a predetermined distance from the point of view and being perpendicular to a line of sight from the point of view. The transparency changing step includes updating, every a unit time, a value indicating the transparency of an object for which it is determined in the distance determining step that at least a portion of the bounding region is closer to the point of view than the boundary surface is, so that the transparency of the object is gradually increased.

In a third aspect based on the second aspect, the bounding region is in the shape of a hexahedron having eight vertices. The distance determining step includes determining that the distance of an object is smaller than or equal to the predetermined distance when at least one of the eight vertices of the bounding region for the object is closer to the point of view than the boundary surface is.

In a fourth aspect based on the first aspect, the game program causes the computer to further execute a central display determining step (S24) of determining whether or not at least a portion of an object present at the predetermined distance or less from the point of view is displayed within a predetermined range including a center of a two-dimensional image obtained by subjecting the virtual space including the object to perspective transformation using the point of view as a reference. The transparency changing step includes updating, every a unit time, information indicating the transparency of only an object which is determined in the central display determining step that at least a portion thereof is displayed within the predetermined range including the center of the two-dimensional image.

In a fifth aspect based on the fourth aspect, the predetermined range including the center of the two-dimensional image used in the determination of the central display determining step is a rectangular region.

In a sixth aspect based on the fifth aspect, the game program causes the computer to further execute an object region setting step of setting an object region which is a rectangular region enclosing an object present at the predetermined distance or less from the point of view, in the two-dimensional image. The central display determining step includes determining that the object for which the object region is set is displayed in the predetermined range including the center of the two-dimensional image when at least a portion of the object region overlaps the predetermined range including the center of the two-dimensional image.

In a seventh aspect based on the first aspect, the transparency changing step includes updating, every a unit time, the information indicating the transparency of the object so that an opacity of the object is increased, when, after updating the information indicating the transparency, it is determined in the distance determining step that the distance of the object for which the information indicating the transparency has been updated is not smaller than or equal to the predetermined distance.

An eighth aspect is directed to a game apparatus for displaying on a screen of a display device a virtual image obtained when at least one object present in a virtual space is observed from a predetermined point of view in the virtual space, the game apparatus comprising a storage section (33), a relative position changing section (30), a distance determining section (30), a transparency changing section (30), and a drawing section (30). The relative position changing section changes a relative position of each object with respect to the point of view by changing at least one of information indicating a position of the point of view and information indicating a position of the object, the pieces of information being stored in a storage section. The distance determining section determines, every a unit time, whether or not a distance from the point of view to each object in the virtual space is smaller than or equal to a predetermined distance, with reference to the information indicating the point of view or the information indicating the position of the object. The transparency changing section changes, every a unit time, information indicating a transparency of an object whose distance is determined by the distance determining section to be smaller than or equal to the predetermined distance, so that the transparency of the object is gradually increased, the information indicating the transparency of the object being stored in the storage section. The drawing section draws a virtual image including the object with reference to the information indicating the transparency.

According to the first aspect, when an object comes within the predetermined distance from the predetermined point of view, the transparency is increased every a unit time. Therefore, even when an object suddenly appears before the virtual camera, the object can be caused to gradually become transparent. Thereby, it is possible to reduce awkwardness or unnaturalness which a player otherwise feels due to sudden disappearance of the object which has appeared on a screen.

According to the second and third aspects, a simple process can be used to determine whether or not an object comes within the predetermined distance from the predetermined point of view. Therefore, the processing load of the computer can be reduced.

According to the fourth aspect, even when an object comes within the predetermined distance from the predetermined point of view, but is displayed at an end of a screen, so that the object substantially does not obstruct the sight of a player, the transparency process is not performed. In other words, only an object which is displayed in the vicinity of a center of the screen and obstructs the sight of the player can be caused to become transparent. Therefore, objects can be efficiently caused to become transparent. Also, it is possible to reduce awkwardness or unnaturalness which the player otherwise feels since even an object which substantially does not obstruct the sight of the player is caused to become transparent.

According to the fifth and sixth aspects, a simple process can be used to determine whether or not an object is displayed in the vicinity of the center of the screen. Therefore, the processing load of the computer can be reduced.

According to the seventh aspect, when an object which has once been transparent goes outside the predetermined distance, the object is caused to return to the original state which is not transparent. Thereby, it is possible to reduce awkwardness which the player otherwise feels.

Also, according to the game apparatus of the present invention, an effect similar to that of the game program of the present invention can be obtained.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
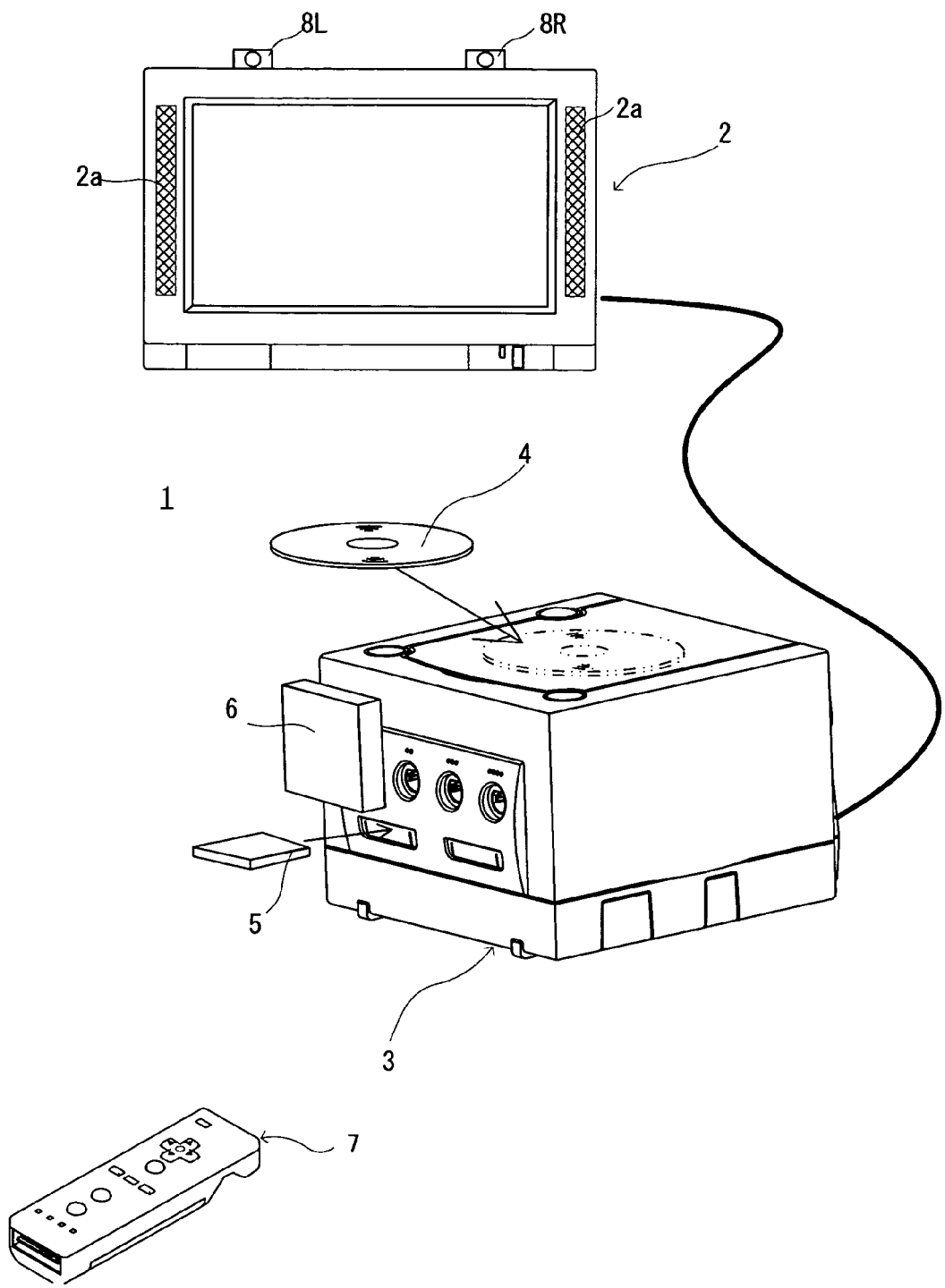
FIG. 1 is an external view for describing a game system 1 according to an embodiment of the present invention.

Referring to FIG. 1, a game apparatus according to an embodiment of the present invention will be described. Hereinafter, to describe the present invention specifically, a game system 1 including the game apparatus will be described as an example. FIG. 1 is an external view for describing the game system 1. Hereinafter, the game system 1 will be described using a stationary game apparatus as an example.

In FIG. 1, the game system 1 comprising a stationary game apparatus (hereinafter simply referred to as a game apparatus) 3 which is connected via a connection code to a display (hereinafter referred to as a monitor) 2 with a loudspeaker 2a, such as a television set for home use or the like, and a controller 7 which inputs operation information to the game apparatus 3. The game apparatus 3 is connected via a connection terminal to a reception unit 6. The reception unit 6 receives transmission data wirelessly transmitted from the controller 7, so that the controller 7 and the game apparatus 3 are connected together via wireless communication. An optical disc 4 which is an exemplary information storing medium changeably used with respect to the game apparatus 3, is detachably attached to the game apparatus 3. On an upper major surface of the game apparatus 3, a power ON/OFF switch for the game apparatus 3, a reset switch for a game process, and an OPEN switch for opening an upper lid of the game apparatus 3, are provided. Here, the lid is opened by a player pushing down the OPEN switch, so that the optical disc 4 can be attached or detached.

An external memory card 5 carrying, for example, a backup memory for fixedly storing saved data or the like, is detachably attached to the game apparatus 3 as required. The game apparatus 3 executes a game program or the like stored on the optical disc 4, and displays a result of the execution as a game image on the monitor 2. The game apparatus 3 can also reproduce a game state which was executed in the past, using saved data stored in the external memory card 5, to display a game image on the monitor 2. The player of the game apparatus 3 can enjoy events of the game by operating the controller 7 while watching a game image displayed on the monitor 2.

The controller 7 wirelessly transmits transmission data from a communication section 75 (described below) included therein to the game apparatus 3 to which the reception unit 6 is connected, using, for example, a Bluetooth(R) technique. The controller 7 is an operation means for operating a player object appearing in a game space displayed on the monitor 2. The controller 7 is provided with an operation section comprising a plurality of operation buttons, keys, sticks or the like. As will be clearly described below, the controller 7 comprises an image capture information computing section 74 for capturing an image viewed from the controller 7. For example, the image capture information computing section 74 captures an image of each of two LED modules (hereinafter referred to as markers) 8a and 8b provided in the vicinity of a display screen of the monitor 2 as objects to be captured. The markers 8L and 8R are provided so as to indicate a position of the controller 7. The markers 8a and 8b output infrared light toward the front of the monitor 2.

Next, a configuration of the game apparatus 3 will be described with reference to FIG. 2. Note that FIG. 2 is a functional block diagram of the game apparatus 3.

Figure 2:
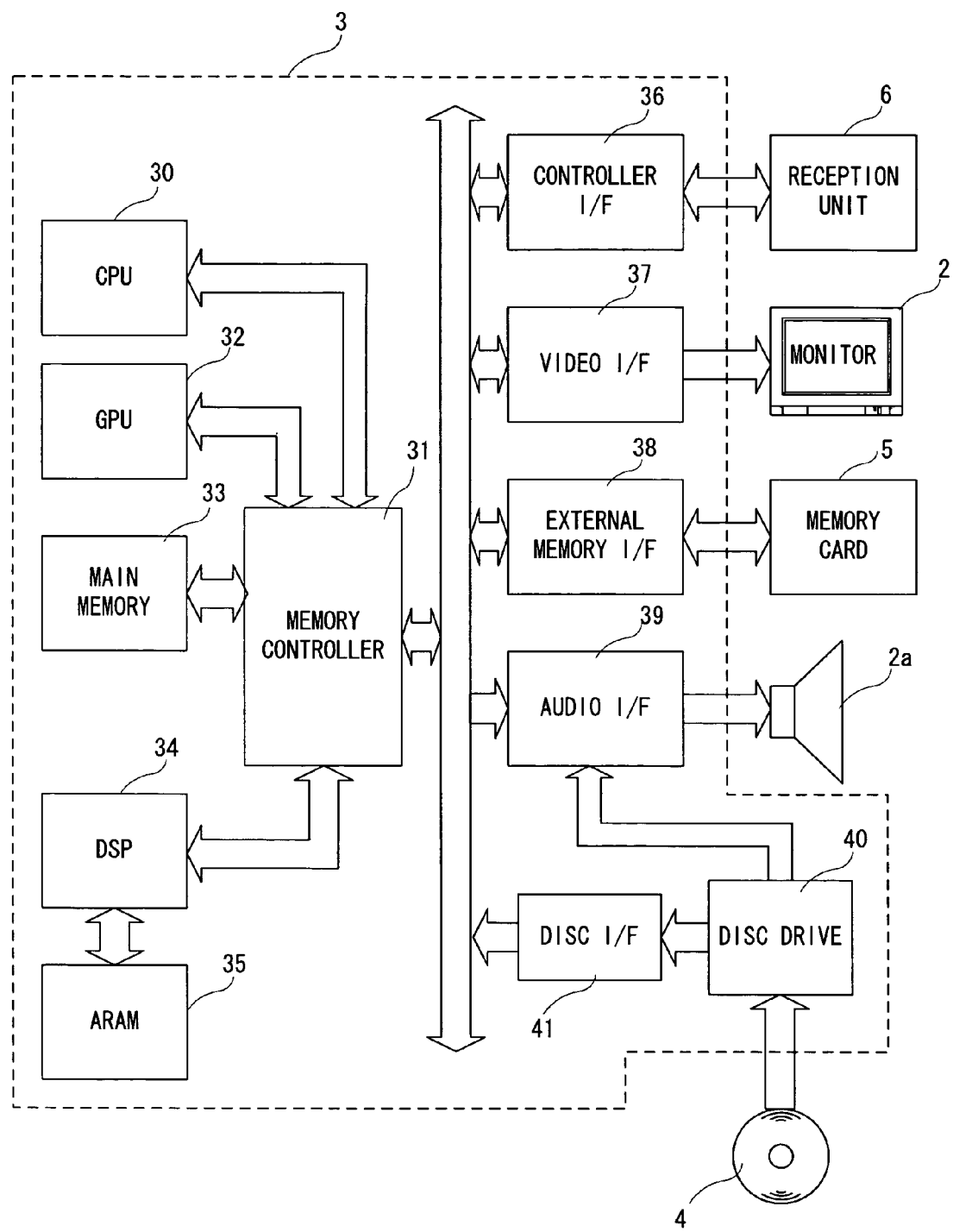
FIG. 2 is a functional block diagram of a game apparatus 3 of FIG. 1.

In FIG. 2, the game apparatus 3 comprises, for example, a RISC CPU (central processing unit) 30 which executes various programs. The CPU 30 executes a startup program stored in a boot ROM (not shown) and performs, for example, initialization of memories, such as a main memory 33 and the like, before executing a game program stored on the optical disc 4, and performing, for example, a game process corresponding to the game program. A GPU (Graphics Processing Unit) 32, the main memory 33, a DSP (Digital Signal Processor) 34, and an ARAM (Audio RAM) 35 are connected via a memory controller 31 to the CPU 30. A controller I/F (interface) 36, a video I/F 37, an external memory I/F 38, an audio I/F 39, and a disc I/F 41 are connected via a predetermined bus to the memory controller 31. The reception unit 6, the monitor 2, the external memory card 5, the loudspeaker 2a, and a disc drive 40 are connected to the controller I/F 36, the video I/F 37, the external memory I/F 38, the audio I/F 39, and the disc I/F 41, respectively.

The GPU 32 performs image processing based on an instruction from the CPU 30, and comprises, for example, a semiconductor chip which performs a computation process required for 3D graphics display. The GPU 32 performs image processing using a memory specialized for image processing or a memory area which is a portion of the main memory 33. The GPU 32 uses these to generate game image data or movie video to be displayed on the monitor 2, and outputs the data via the memory controller 31 and the video I/F 37 to the monitor 2 as appropriate.

The main memory 33 is a memory area used in the CPU 30, and stores a game program or the like required for a process by the CPU 30 as appropriate. For example, the main memory 33 stores a game program, various data or the like read from the optical disc 4 by the CPU 30. The game program, the various data or the like stored in the main memory 33 are executed by the CPU 30.

The DSP 34 processes sound data or the like which is generated in the CPU 30 when a game program is executed. The ARAM 15 for storing the sound data or the like is connected to the DSP 34. The ARAM 15 is used when the DSP 34 performs a predetermined process (e.g., storage of a read-ahead game program or sound data). The DSP 34 reads sound data stored in the ARAM 15, and outputs the data via the memory controller 31 and the audio I/F 39 to the loudspeaker 2a included in the monitor 2.

The memory controller 31 performs a centralized control of data transfer. The above-described various I/F are connected to the memory controller 31. The controller I/F 36 comprises, for example, four controller I/Fs 36a to 36d, and communicably connects an external apparatus which can be engaged with the four controller I/Fs via connectors thereof, and the game apparatus 3. For example, the reception unit 6 is engaged with the connector to be connected via the controller I/F 36 to the game apparatus 3. As described above, the reception unit 6 receives transmission data from the controller 7, and outputs the transmission data via the controller I/F 36 to the CPU 30. The monitor 2 is connected to the video I/F 37. The external memory card 5 is connected to the external memory I/F 38, thereby making it possible to access the backup memory or the like provided in the external memory card 5. The loudspeaker 2a included in the monitor 2 is connected to the audio I/F 39 so that sound data read from the ARAM 15 by the DSP 34 or sound data directly output from the disc drive 40 can be output from the loudspeaker 2a. The disc drive 40 is connected to the disc I/F 21. The disc drive 40 reads data stored at a predetermined read-out position on the optical disc 4, and outputs the data to the bus and the audio I/F 39 of the game apparatus 3.

Figure 3:
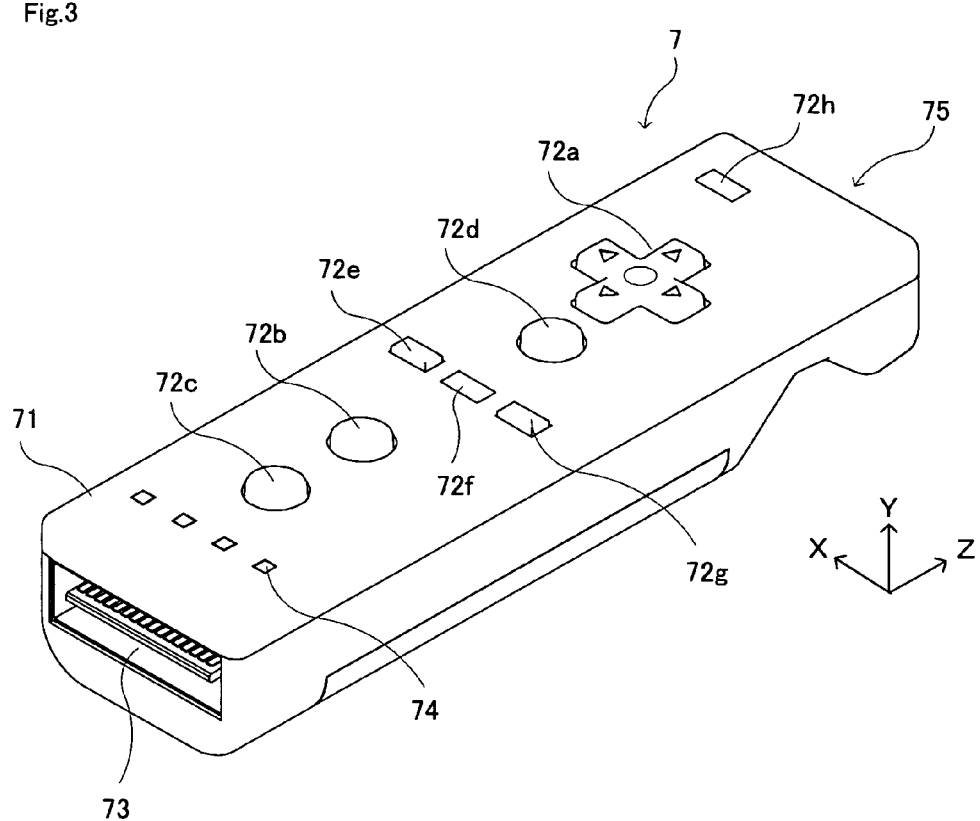
FIG. 3 is a perspective view of a controller 7 of FIG. 1 as viewed from the top and the rear.
Figure 4:
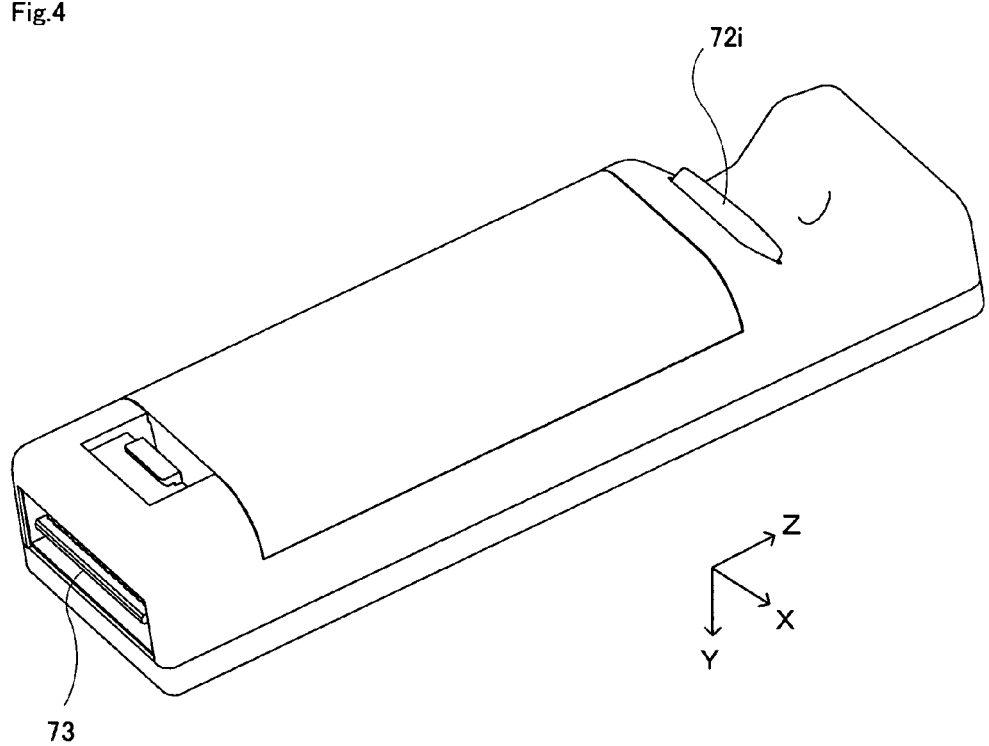
FIG. 4 is a perspective view of the controller 7 of FIG. 1 as viewed from the bottom and the rear.

The controller 7 as an exemplary input device in the present invention will be described with reference to FIGS. 3 to 4. FIG. 3 is a perspective view of the controller 7 as viewed from the top and the rear. FIG. 4 is a perspective view of the controller 7 as viewed from the bottom and the rear.

In FIGS. 3 and 4, the controller 7 has a housing 71 formed by, for example, plastic molding. The housing 71 is provided with a plurality of operation sections 72. The housing 71 is in the shape of substantially a rectangular parallelepiped where a front-to-rear direction is a longitudinal direction. The whole housing 71 has a size which allows an adult and a child to hold the controller 7 with one hand.

A cross key 72a is provided on a central portion closer to a front side of an upper surface of the housing 71. The cross key 72a is a four-direction push switch in the shape of a cross, and has operation portions corresponding to the respective four directions (frontward, rearward, leftward, and rightward) indicated by arrows, the operation portions being provided at the respective projecting pieces of the cross which are arranged at intervals of 90°. Any of the frontward, rearward, leftward and rightward directions is selected by a player pushing down any of the operation portions of the cross key 72a. For example, by a player operating the cross key 72a, a movement direction of a player character or the like appearing in a virtual game world can be designated, or a movement direction of a cursor can be designated.

Note that the cross key 72a is an operation section which outputs an operation signal, depending on the above-described direction input operation by a player, or may be an operation section of other embodiments. For example, a complex switch comprising a push switch having four direction operation portions arranged in a ring shape, and a center switch provided at a center thereof, may be provided instead of the cross key 72a. Also, instead of the cross key 72a, an operation section may be provided which outputs an operation signal, depending on a tilt direction of a tiltable stick which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a. Also, instead of the cross key 72a, an operation section may be provided which outputs an operation signal, depending on which is pushed down among switches indicating at least four directions (frontward, rearward, leftward, and rightward).

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of an X button, a Y button, a B button, and the like are assigned to the operation buttons 72b to 72d. Functions of a select switch, a menu switch, a start switch, and the like are assigned to the operation buttons 72e to 72g. Although the operation buttons 72b to 72g are assigned the respective functions, depending on a game program executed by the game apparatus 3, those are not directly involved with the description of the present invention and will not be described in detail. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that a player is prevented from unintentionally and erroneously pushing down the button.

An operation button 72h is provided at the front of the cross key 72a on the upper surface of the housing 71. The operation button 72h is a power supply switch which remotely switches ON/OFF a power supply for the main body of the game apparatus 3. The operation button 72h is also a button of a type whose upper surface is buried below the upper surface of the housing 71 so that a player is prevented from unintentionally and erroneously pushing down the button.

A plurality of LEDs 702 are provided at the rear of the operation button 72c of the upper surface of the housing 71. Here, the controller 7 is assigned controller identification (number) so as to distinguish it from other controllers 7. For example, the LEDs 702 are used so as to notify the player of controller identification currently set for the controller 7. Specifically, when transmission data is transmitted from the controller 7 to the reception unit 6, one of the plurality of LEDs 702 is turned ON, depending on the controller identification.

On the other hand, a hollow portion is formed on a lower surface of the housing 71. The hollow portion on the lower surface of the housing 71 is formed at a position where the index finger or the middle finger of a player is placed when the player holds the controller 7, as specifically described below. An operation button 72i is provided on a rear slope surface of the hollow portion. The operation button 72i is an operation section which functions as, for example, an A button, and which is used as a trigger switch for a shooting game, or for an operation of causing a player object to be noticeable with respect to a predetermined object, or the like.

An image capturing element 743 which is a part of the image capture information computing section 74 is provided on a front surface of the housing 71. Here, the image capture information computing section 74 is a system for analyzing image data captured by the controller 7 to determine a place having a high luminance in the image data and detecting a center-of-gravity position or a size of the place or the like. The image capture information computing section 74 has, for example, a maximum sampling cycle of about 200 frames/sec, and therefore, can track and analyze relatively high-speed movement of the controller 7. A connector 73 is provided on a rear surface of the housing 71. The connector 33 is, for example, a 32-pin edge connector which is utilized so as to be engaged and connected with a connection cable.

Here, to specifically describe the present invention, a coordinate system which is provided with respect to the controller 7 is defined. As illustrated in FIGS. 3 and 4, X, Y and Z axes, which are orthogonal to each other, are defined with respect to the controller 7. Specifically, a front-to-rear direction of the controller 7 (a longitudinal direction of the housing 71) is assumed to be the Z axis, and a front (a surface on which the image capture information computing section 74 is provided) direction of the controller 7 is assumed to be the positive direction of the Z axis. A vertical direction of the controller 7 is assumed to be the Y axis, and an upper surface (a surface on which the cross key 72a and the like are provided) direction of the housing 71 is assumed to be the positive direction of the Y axis. A lateral direction of the controller 7 is assumed to be the X axis, and a left side surface (a side surface illustrated in FIG. 4, but not in FIG. 3) direction of the housing 71 is assumed to be the positive direction of the X axis.

Figure 5A:
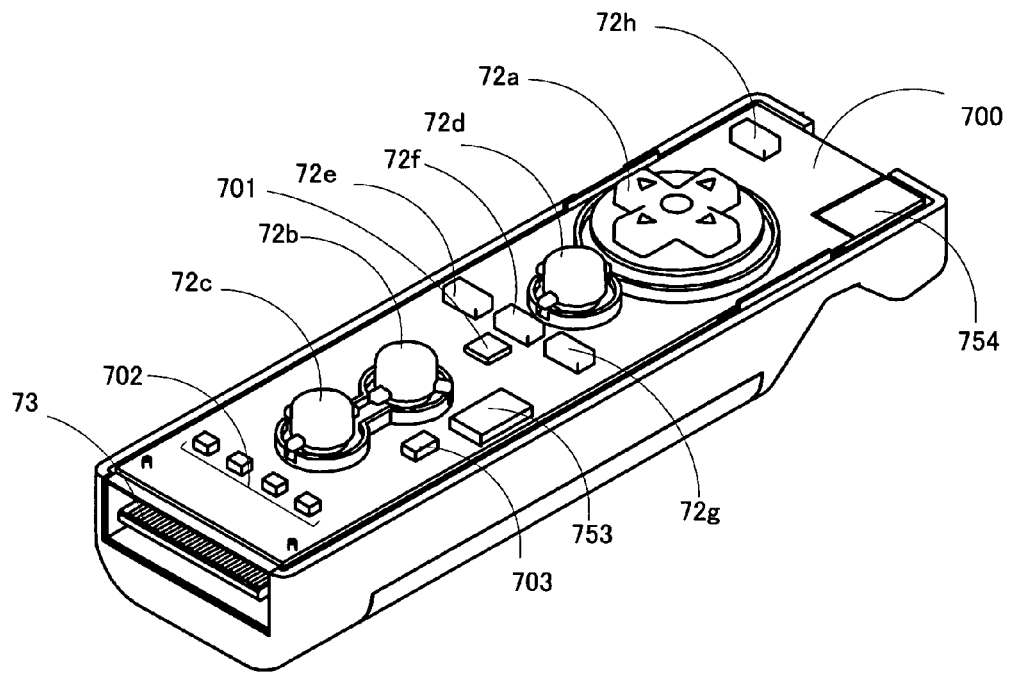
FIG. 5A is a perspective view of the controller 7 of FIG. 1 where an upper housing thereof is cut away.
Figure 5B:
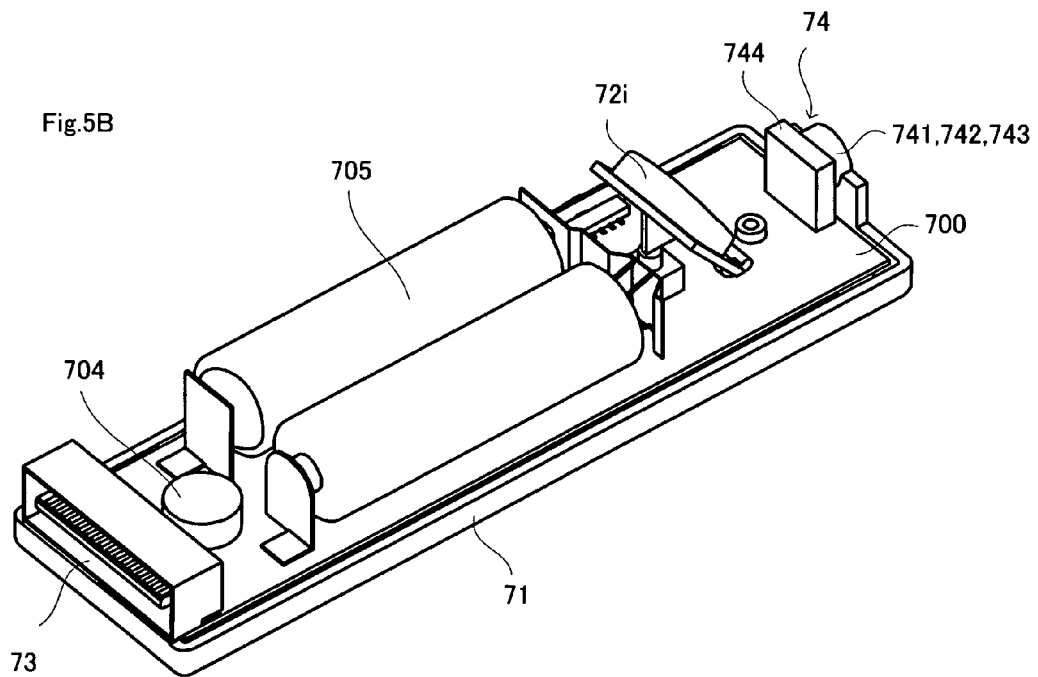
FIG. 5B is a perspective view of the controller 7 of FIG. 1 where a lower housing thereof is cut away.

Next, an internal structure of the controller 7 will be described with reference to FIGS. 5A and 5B. Note that FIG. 5A is a perspective view of the controller 7 where an upper housing (a portion of the housing 71) is cut away. FIG. 5B is a perspective view of the controller 7 where a lower housing (a portion of the housing 71) is cut away. FIG. 5B illustrates a perspective view of a base board 700 of FIG. 5A as viewed from a bottom surface thereof.

In FIG. 5A, the base board 700 is fixed inside the housing 71. On an upper major surface of the base board 700, the operation buttons 72a to 72h, an acceleration sensor 701, the LEDs 702, a quartz oscillator 703, a radio module 753, an antenna 754, and the like are provided. These are connected to a microcomputer 751 (see FIG. 6) via conductors (not shown) formed on the base board 700 and the like. The acceleration sensor 701 detects and outputs an acceleration which can be used to calculate a tilt, a vibration, or the like in a three-dimensional space in which the controller 7 is placed.

Figure 6:
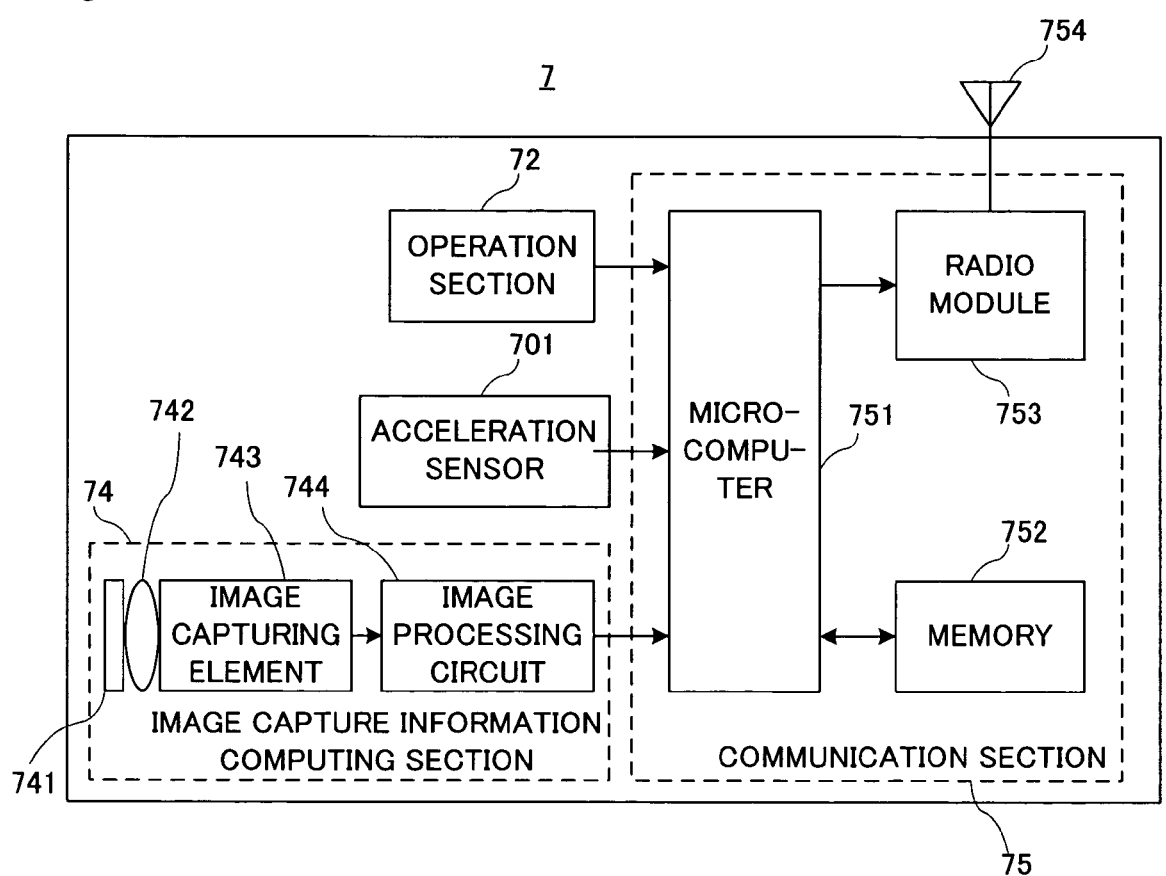
FIG. 6 is a block diagram illustrating a configuration of the controller 7 of FIG. 1.

More specifically, as illustrated in FIG. 6, the controller 7 preferably comprises a three-axis acceleration sensor 701. The three-axis acceleration sensor 701 detects linear accelerations in three directions, i.e., the vertical direction (the Y axis of FIG. 3), the lateral direction (the X axis of FIG. 3), and the front-to-rear direction (the Z axis of FIG. 3). In other embodiments, a two-axis acceleration detecting means for detecting only a linear acceleration in each of the X axis and the Y axis (or other pairs of axes), may be employed, depending on the type of a control signal used in a game process. For example, the three- or two-axis acceleration sensor 701 may be of a type which is available from Analog Devices, Inc. or STMicroelectronics N.V. The acceleration sensor 701 is preferably of a capacitance type (capacitance coupling type) based on a technique of MEMS (Micro Electro Mechanical Systems) obtained by micromachining silicon. However, the three- or two-axis acceleration sensor 701 may be provided using a technique of existing acceleration detecting means (e.g., a piezoelectric type or a piezoelectric resistance type) or other appropriate techniques which will be developed in the future.

As is known to those skilled in the art, an acceleration detecting means used as the acceleration sensor 701 can detect only an acceleration (linear acceleration) along a straight line corresponding to each axis of an acceleration sensor. In other words, a direct output from the acceleration sensor 701 is a signal indicating a linear acceleration (static or dynamic) along each of the two or three axes. Therefore, the acceleration sensor 701 cannot directly detect physical properties, such as a motion along a non-linear path (e.g., an arc, etc.), a rotation, a rotational motion, an angular displacement, a tilt, a position, an attitude, and the like.

However, it would be easily understood by those skilled in the art from the description of the present specification that further information about the controller 7 can be estimated or calculated (determined) by performing an additional process with respect to an acceleration signal output from the acceleration sensor 701. For example, when a static acceleration (gravity acceleration) is sensed, an output from the acceleration sensor 701 is used to perform a computation using a tilt angle and the detected acceleration, thereby making it possible to determine a tilt of a subject (the controller 7) with respect to a gravity vector. Thus, by using the acceleration sensor 701 in combination with the microcomputer 751 (or other processors), the tilt, attitude or position of the controller 7 can be determined. Similarly, for example, when the controller 7 comprising the acceleration sensor 701 is dynamically accelerated and moved by a user's hand as described below, various motions and/or positions of the controller 7 can be calculated by processing an acceleration signal generated by the acceleration sensor 701. In other examples, the acceleration sensor 701 may comprise an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravity acceleration) by the acceleration sensor, may be for converting a sensed acceleration signal into a tilt angle corresponding thereto (or other preferable parameters).

The controller 7 functions as a wireless controller by means of the communication section 75 having the radio module 753 and the antenna 754. Note that the quartz oscillator 703 generates a basic clock for the microcomputer 751 (described below).

On the other hand, in FIG. 5B, the image capture information computing section 74 is provided at a front edge of a lower major surface of the base board 700. The image capture information computing section 74 comprises an infrared filter 741, a lens 742, an image capturing element 743, and an image processing circuit 744, which are attached to the lower major surface of the base board 700 in this order from the front of the controller 7. The connector 73 is attached to a rear edge of the lower major surface of the base board 700. The operation button 72i is attached at the rear of the image capture information computing section 74 and on the lower major surface of the base board 700. Batteries 705 are housed at the rear of the operation button 72i. A vibrator 704 is attached on the lower major surface of the base board 700 and between the batteries 705 and the connector 73. The vibrator 704 may be, for example, a vibration motor or a solenoid. Vibration occurs in the controller 7 by an action of the vibrator 704, and is transferred to a player who is holding the controller 7, thereby achieving a so-called vibration feature-supporting game.

Next, an internal configuration of FIG. 6 will be described with reference to FIG. 6. Note that FIG. 6 is a block diagram illustrating the configuration of the controller 7.

The image capture information computing section 74 includes the infrared filter 741, the lens 742, the image capturing element 743, and the image processing circuit 744. The infrared filter 741 passes only infrared light entering from the front of the controller 7. Here, the markers 8L and 8R are infrared LEDs which output infrared light toward the front of the monitor 2. Therefore, images of the markers 8L and 8R can be more correctly captured by proving the infrared filter 741. The lens 742 collects infrared light passing through the infrared filter 741 and causes the light to enter the image capturing element 743. The image capturing element 743 may be, for example, a solid-state image capturing element, such as a CMOS sensor or a CCD, and captures infrared light collected by the lens 742. Therefore, the image capturing element 743 captures only infrared light passing through the infrared filter 741 to generate image data. The image data generated by the image capturing element 743 is processed by the image processing circuit 744. Specifically, the image processing circuit 744 processes the image data (the captured images of the markers 8L and 8R) obtained from the image capturing element 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself. Based on the process result data output from the image capture information computing section 74, a signal depending on the position or motion of the controller 7 can be obtained. Input coordinates based on the screen coordinate system of the monitor 2 can be obtained based on the signal. In other words, the controller 7 functions as a pointing device based on the process result data output from the image capture information computing section 74.

As described above, the acceleration sensor 701 is a sensor which senses and outputs an acceleration with respect to each of the three components of the controller 7, i.e., the vertical direction (Y-axis direction), the lateral direction (X-axis direction), and the front-to-rear direction (Z-axis direction). Data indicating accelerations corresponding to the three axial components sensed by the acceleration sensor 701, is output to the communication section 75. Based on the acceleration data output from the acceleration sensor 701, a motion of the controller 7 can be determined. Note that the acceleration sensor 701 may be an acceleration sensor for detecting an acceleration with respect to each of any two of the three axes, depending on data required for a specific application.

The communication section 75 comprises the microcomputer 751, a memory 752, the radio module 753, and the antenna 754. The microcomputer 751 controls the radio module 753 for wirelessly transmitting transmission data while using the memory 752 as a memory area during a process.

An operation signal (key data) from the operation section 72 provided in the controller 7, acceleration signals in the three axial directions (X-, Y- and Z-axis direction acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, and the process result data), as transmission data to be transmitted to the reception unit 6, into the memory 752. Here, radio transmission from the communication section 75 to the reception unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth(®) is 5 ms. When timing of transmission to the reception unit 6 arrives, the microcomputer 751 outputs transmission data stored in the memory 752, as a series of pieces of operation information, to the radio module 753. Thereafter, the radio module 753 emits the operation information, as a radio signal, from the antenna 754 using carrier waves having a predetermined frequency by means of, for example, the Bluetooth(®) technique. Specifically, the key data from the operation section 72 provided in the controller 7, the X-, Y- and Z-axis direction acceleration data from the acceleration sensor 701, and the process result data from the image capture information computing section 74 are transmitted from the controller 7. Thereafter, the reception unit 6 of the game apparatus 3 receives the radio signal, and the game apparatus 3 demodulates or decodes the radio signal, thereby obtaining a series of pieces of operation information (the key data, the X-, Y- and Z-axis direction acceleration data, and the process result data). Thereafter, the CPU 30 of the game apparatus 3 performs a game process based on the obtained operation information and a game program. Note that, when the communication section 75 is configured using the Bluetooth(®) technique, the communication section 75 can also have a function of receiving transmission data wirelessly transmitted from other devices.

Next, an outline of a game assumed in this embodiment will be described with reference to FIG. 7. The game assumed in this embodiment is a simulation role playing game (hereinafter referred to an SRPG). Particularly, a process for a battle scene is assumed. Specifically, in a map screen on which a plurality of player units and enemy units are displayed, a player issues a command "move" to a player unit of its own army, so that the player unit can be moved to a desired position. When the player unit is adjacent to an enemy unit at the destination, the player can issue a command "battle". In this case, a list of a plurality of weapons (e.g., a silver sword, a steel spear, etc.) carried by the player unit is displayed, the player selects a weapon which the player wants to use. Thereby, the game screen is changed from the map screen to a screen showing a battle scene as illustrated in FIG. 7.

Figure 7:
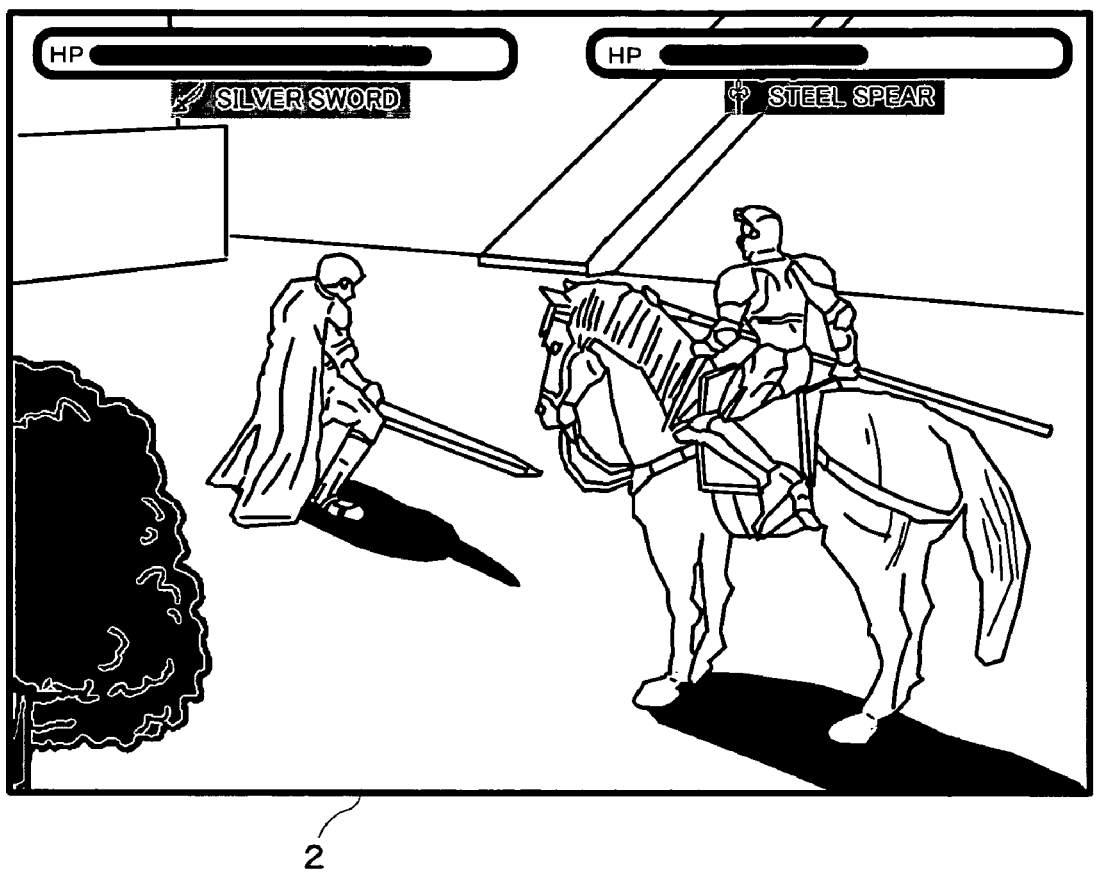
FIG. 7 is a diagram illustrating an exemplary screen showing a battle scene assumed in the embodiment.

FIG. 7 illustrates an exemplary screen showing a battle scene assumed in this embodiment. In FIG. 7, a 3D virtual space (hereinafter referred to as a battle space) is displayed in the battle scene. In the battle space, it is displayed how the player unit attacks the enemy unit. Depending on the attack, a virtual camera (point of view) shooting the battle space is moved as appropriate (i.e., a camera work is performed). For example, a camera work is performed as follows: the virtual camera is initially placed at a rear of the player unit, and is then moved around to a side of the player unit in accordance with a motion of the player unit jumping on and attacking the enemy unit. As another example, a camera work is performed as follows: the virtual camera is initially placed at a distance so that the whole bodies of the player unit and the enemy unit are displayed on the screen (the camera was pulled away), and is then moved close to the player unit and the enemy unit in accordance with a motion of the player unit jumping on and attacking the enemy unit. Here, it is assumed that camera works varying depending on a unit type and a weapon are previously prepared. For example, when the unit type is "swordsman" and the weapon used in the attack is a "silver sword", the camera work in which the camera is moved around to the side from the rear is performed as described above. When the unit type is "cavalryman" and the weapon is a "steel spear", the camera work in which the camera is moved to gradually approach the unit from a distance is performed.

It is assumed that, when the camera work is performed (e.g., the virtual camera is moved around from the rear to the side), there is an object (a tree) between the virtual camera and a player unit. In addition, if the tree object is positioned in the front of the virtual camera just when the attack of the player unit hits the enemy unit, the view of the attack hitting the enemy unit is obstructed by the tree. Similarly, assuming that the camera is moved to gradually approach from a distance, if there is a tree object at a midpoint, the tree may partially obstruct the view of a series of attacking motions of the player unit. Particularly, when a special motion is used as an attacking motion (e.g., a finishing move, etc.), the motion cannot be seen at all. In other words, the view of the attacking motion of the player unit (or the enemy unit) may be partially obstructed by the tree object (obstacle). Therefore, in this embodiment, when, as a result of the camera work, the tree object comes near the center of the screen to obstruct the view of the player unit, a process is performed so that the tree object is caused to gradually become transparent, thereby allowing the player to see a motion of the unit.

Figure 8:
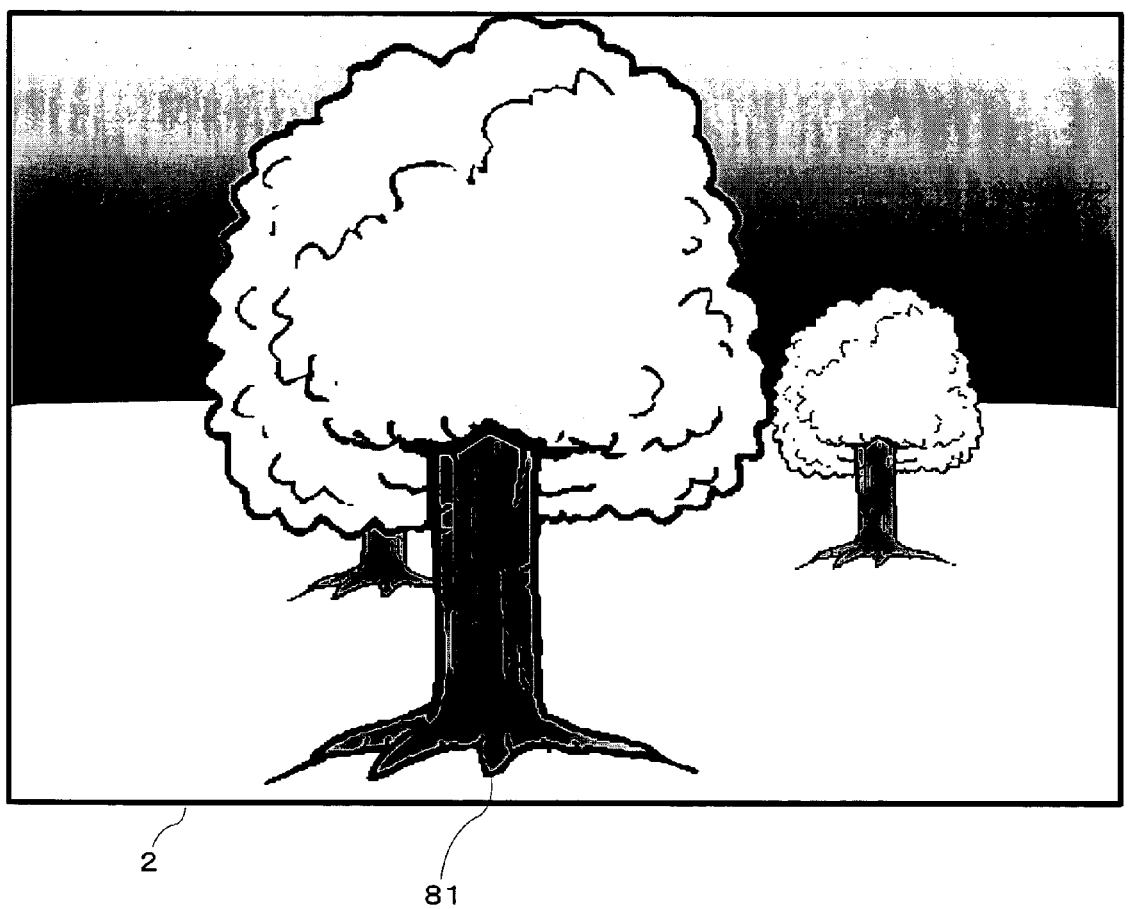
FIG. 8 is a diagram illustrating an exemplary screen of the battle space before a transparency process is performed.
Figure 9:
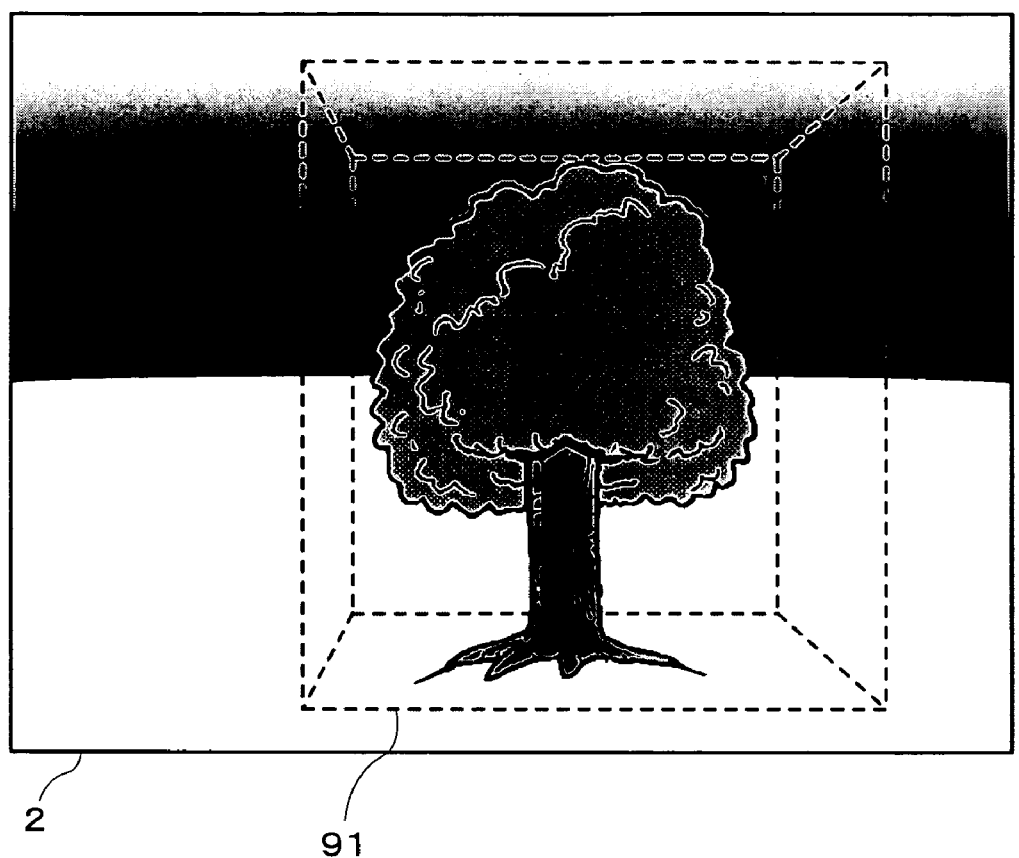
FIG. 9 is a diagram for describing a bounding box.

Next, an outline of the process of causing an object to become transparent will be described with reference to FIGS. 8 to 15. FIG. 8 illustrates an exemplary screen of the battle space before the transparency process of this embodiment is performed (for the sake of simplicity, the player unit, the enemy unit and the like are not shown). On this screen, three tree objects are displayed. A tree 81 which is positioned at a center of the screen and viewed closest to the player, is an obstacle which obstructs the sight of the player. The tree 81 is now caused to become transparent. To achieve this, in this embodiment, a region called a bounding box is set. The bounding box is a hexahedral region having a size (preferably minimum) which accommodates each object (here, the tree 81) provided in a battle space, as illustrated in FIG. 9. Although a bounding box 91 is illustrated in FIG. 9 for the sake of easy understanding, the bounding box 91 is not display on the actual battle screen.

Figure 10:
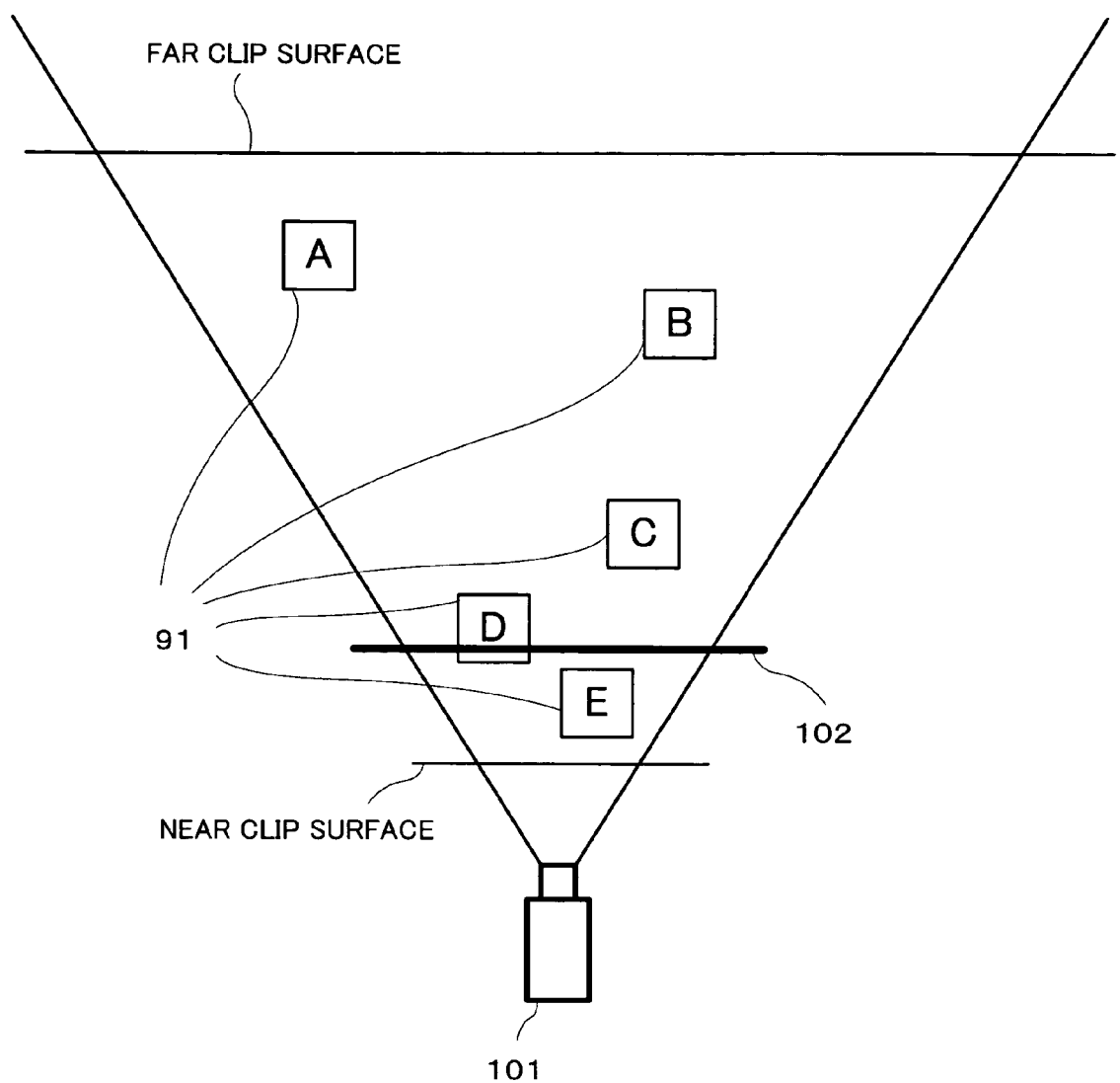
FIG. 10 is a diagram for describing a relationship between a bounding box and a boundary surface.

Next, apart from the bounding box, a boundary surface is provided at a predetermined distance in a depth direction from a near clip surface of the virtual camera. When the bounding box is positioned closer to the player (or the virtual camera) than the boundary surface is, a building object enclosed by the bounding box is subjected to the transparency process. FIG. 10 is a diagram for describing a relationship between a bounding box and a boundary surface. In FIG. 10, a boundary surface 102 is provided at a predetermined distance from a near clip surface of a virtual camera 101. Also, here, as an example, five bounding boxes 91A to 91E are provided in a battle space. Of the bounding boxes 91A to 91E, the entirety of the bounding box 91E is positioned closer to the virtual camera 101 than the boundary surface 102 is. The bounding box 91D is positioned across the boundary surface 102, so that only a portion thereof is positioned closer to the virtual camera 101 than the boundary surface 102 is. The entirety of each of the bounding boxes 91A to 91C is positioned deeper than the boundary surface 102. In such a case, objects corresponding to the bounding boxes 91A to 91C deeper than the boundary surface 102 are not subjected to the transparency process. On the other hand, an object corresponding to the bounding box 91E which is positioned closer to the virtual camera 102 than the boundary surface 102 is, is subjected to the transparency process. An object corresponding to the bounding box 91D positioned across the boundary surface 102 is also subject to the transparency process. In other words, if only a portion of a bounding box goes beyond the boundary surface 102 and closer to the virtual camera 101, an object for which the bounding box is set is subjected to the transparency process.

The transparency process is not started as soon as the bounding box goes beyond the boundary surface 102. Further, it is determined whether or not the bounding box beyond the boundary surface 102 is positioned in the vicinity of the center of the screen. Only an object for which the bounding box positioned in the vicinity of the center is set is subjected to the transparency process. This is because, even if an object is present closer to the player than the boundary surface is, but is positioned and displayed near an end of the screen, the object does not necessarily obstruct the sight of the player.

Figure 11:
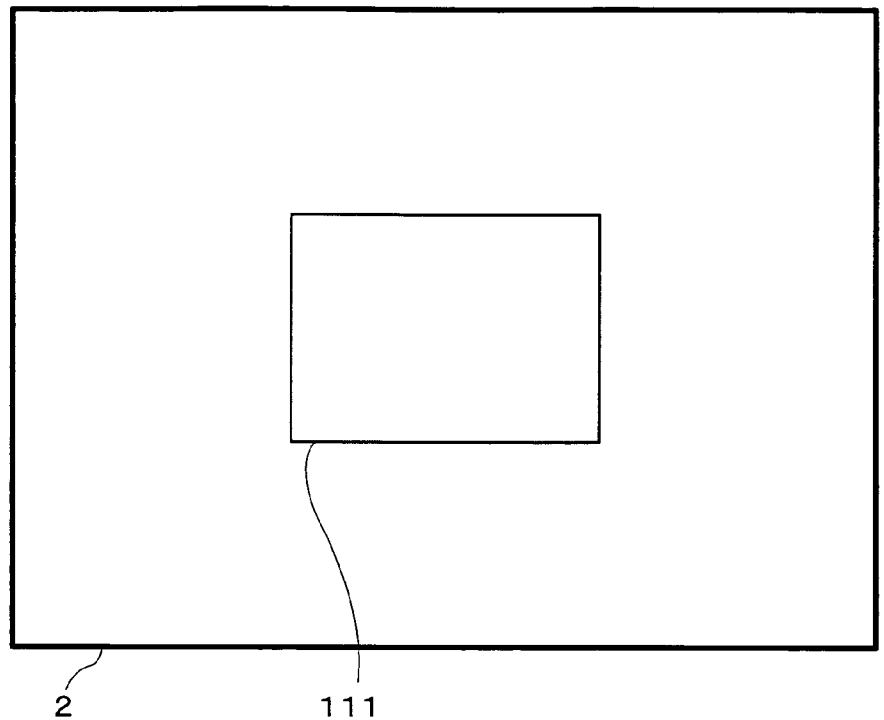
FIG. 11 is a diagram for describing a central region.
Figure 12:
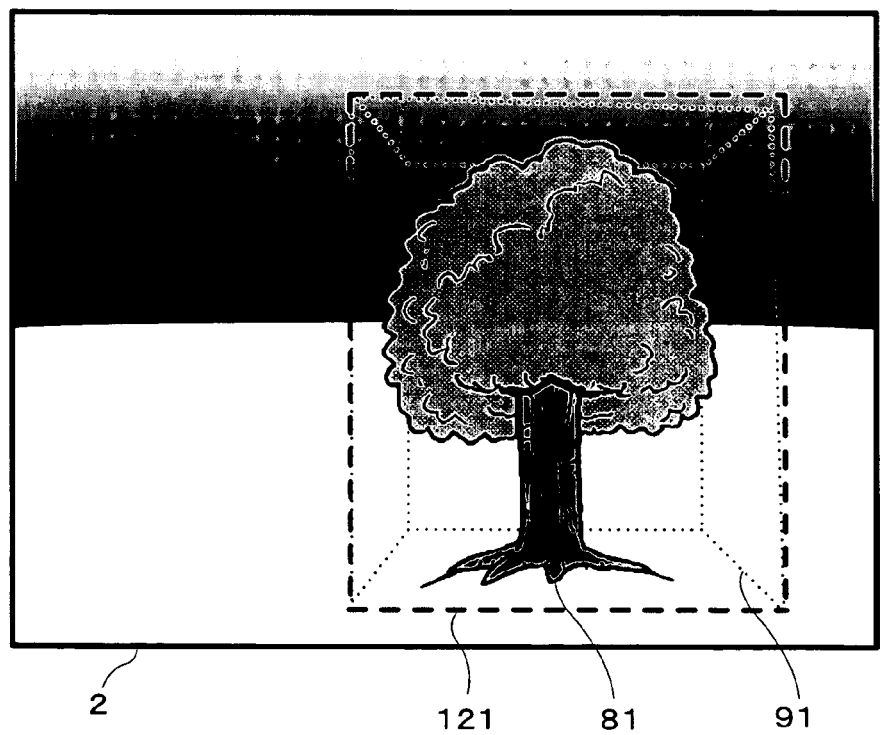
FIG. 12 is a diagram for describing a rectangular region.
Figure 13:
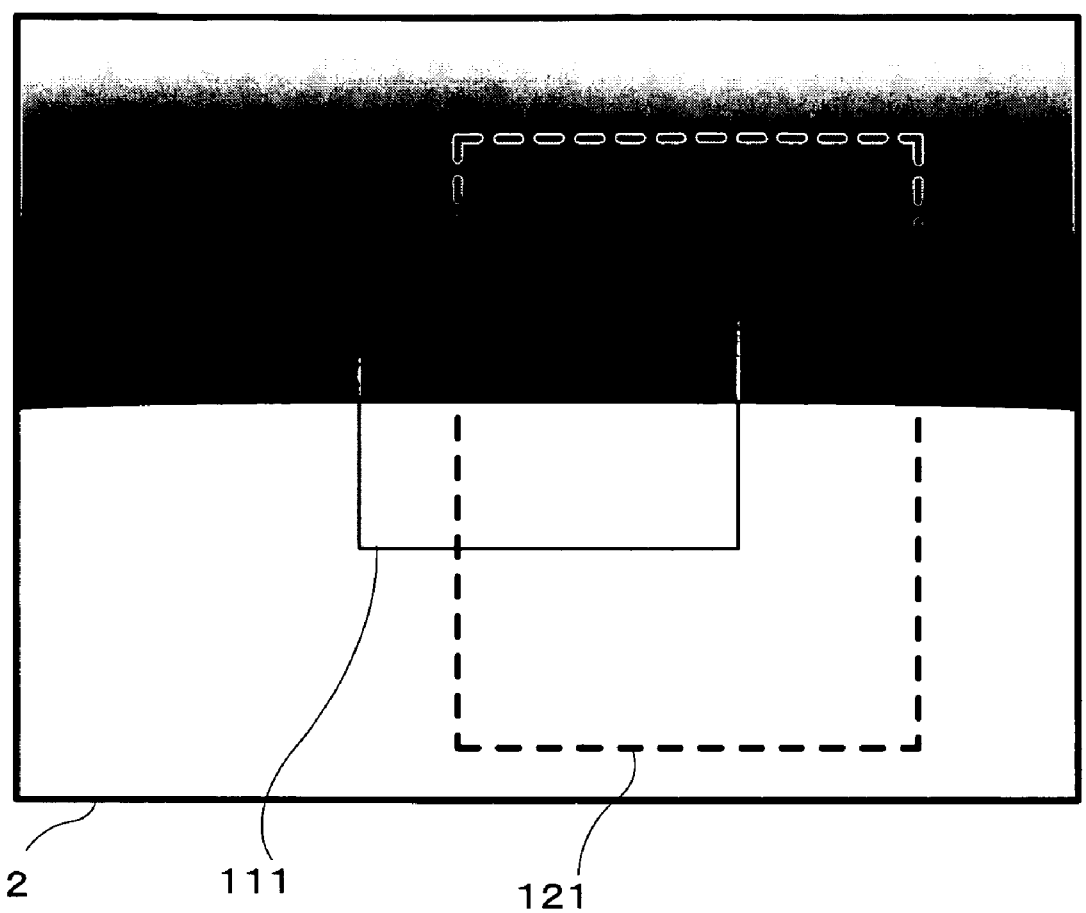
FIG. 13 is a diagram for indicating that the rectangular region overlaps the central region.

The following method is used to determine whether or not a bounding box is positioned in the vicinity of the center of the screen. Initially, in a coordinate system (screen coordinate system) of a two-dimensional image which is obtained by subjecting the battle space to perspective transformation using a position of the virtual camera 101 as a reference, a region 111 (hereinafter referred to as a central region) having a predetermined size and including a center of the two-dimensional image is set as illustrated in FIG. 11. Next, in the same screen coordinate system, a rectangular region 121 as illustrated in FIG. 12 is set for each arranged object. The rectangular region 121 is a region configured based on the bounding box, and has a size (preferably minimum) which completely covers the bounding box. As illustrated in FIG. 13, when the rectangular region 121 overlaps the central region 111, the tree 81 for which the rectangular region 121 is set is subjected to the transparency process. When the rectangular region 121 does not overlap the central region 111, the tree 81 for which the rectangular region 121 is set is not subjected to the transparency process.

The above-described process is here summarized. Initially, in the 3D coordinate system, it is determined whether or not a bounding box 91 is positioned closer to the player than the boundary surface 102 is. Next, if the bounding box 91 is positioned closer to the player than the boundary surface 102 is, it is further determined whether or not the bounding box 91 is positioned in the vicinity of the center of the screen in the 2D coordinate system. As a result, only an object that is positioned closer to the player than the boundary surface 102 is and is positioned in the vicinity of the center of the screen is subjected to the transparency process.

Figure 14:
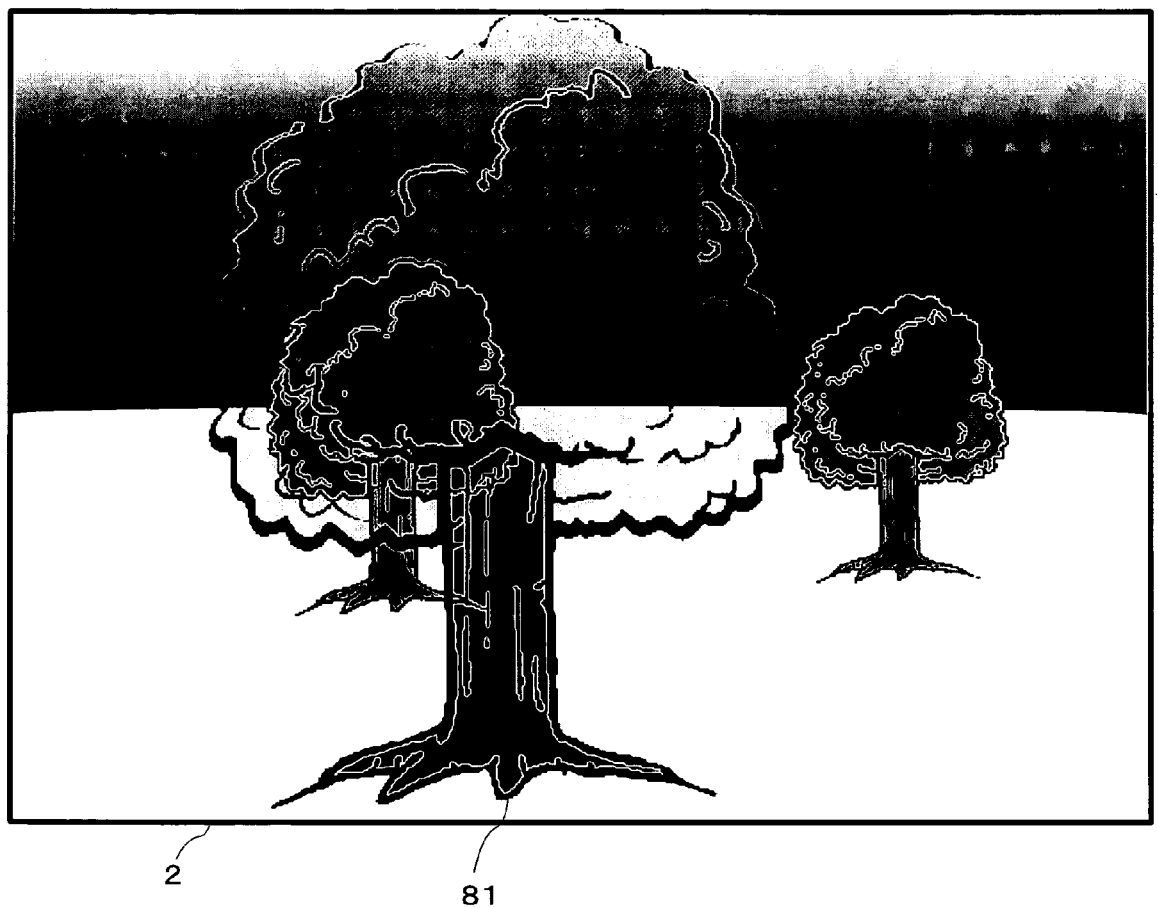
FIG. 14 is a diagram illustrating an exemplary screen during a transparency process.
Figure 15:
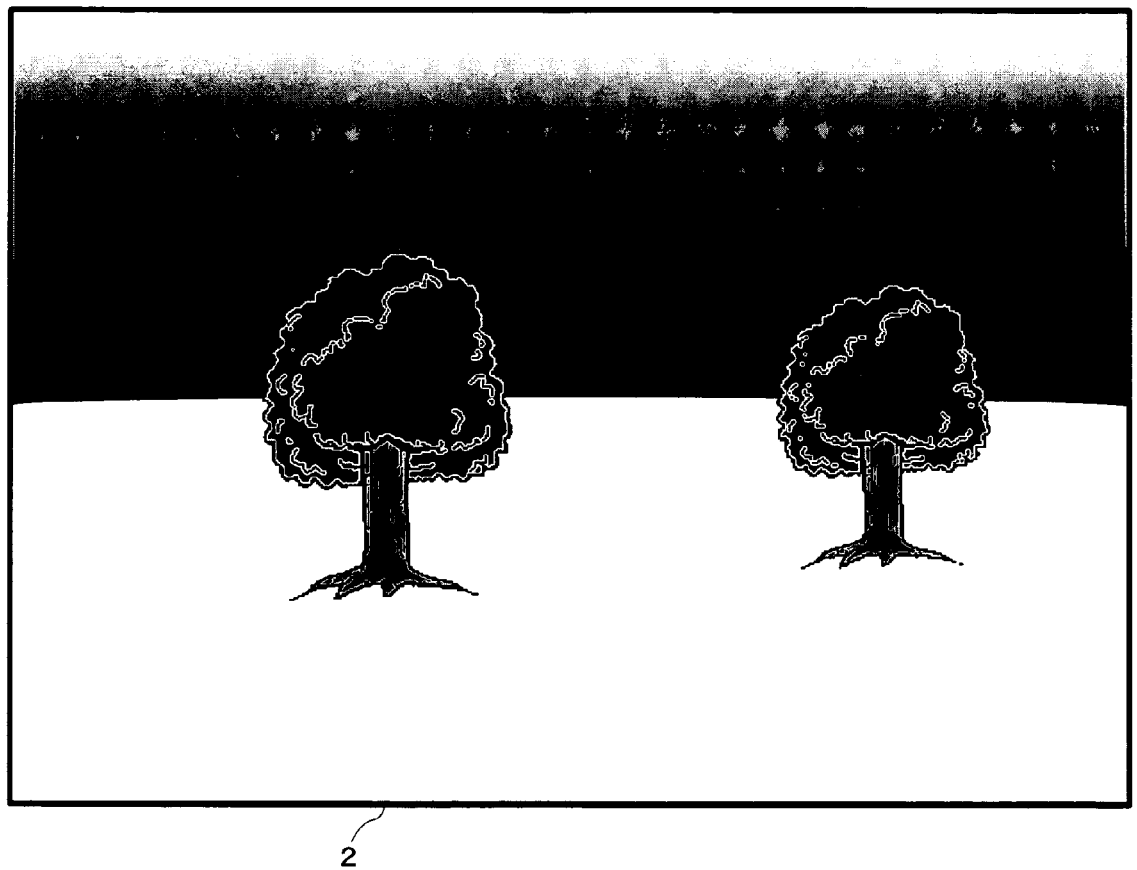
FIG. 15 is a diagram illustrating an exemplary screen after the transparency process.

In the transparency process, an object is not caused to instantaneously become transparent (change the transparency to 100%), but the transparency is increased by a predetermined value every one frame. Thereby, as illustrated in FIG. 14, the tree 81 gradually becomes transparent. Finally, as illustrated in FIG. 15, the tree 81 becomes completely transparent, so that a scene behind the tree 81 can be viewed. Thereby, it is possible to prevent the player from feeling awkward due to sudden disappearance of the tree 81.

Figure 16:
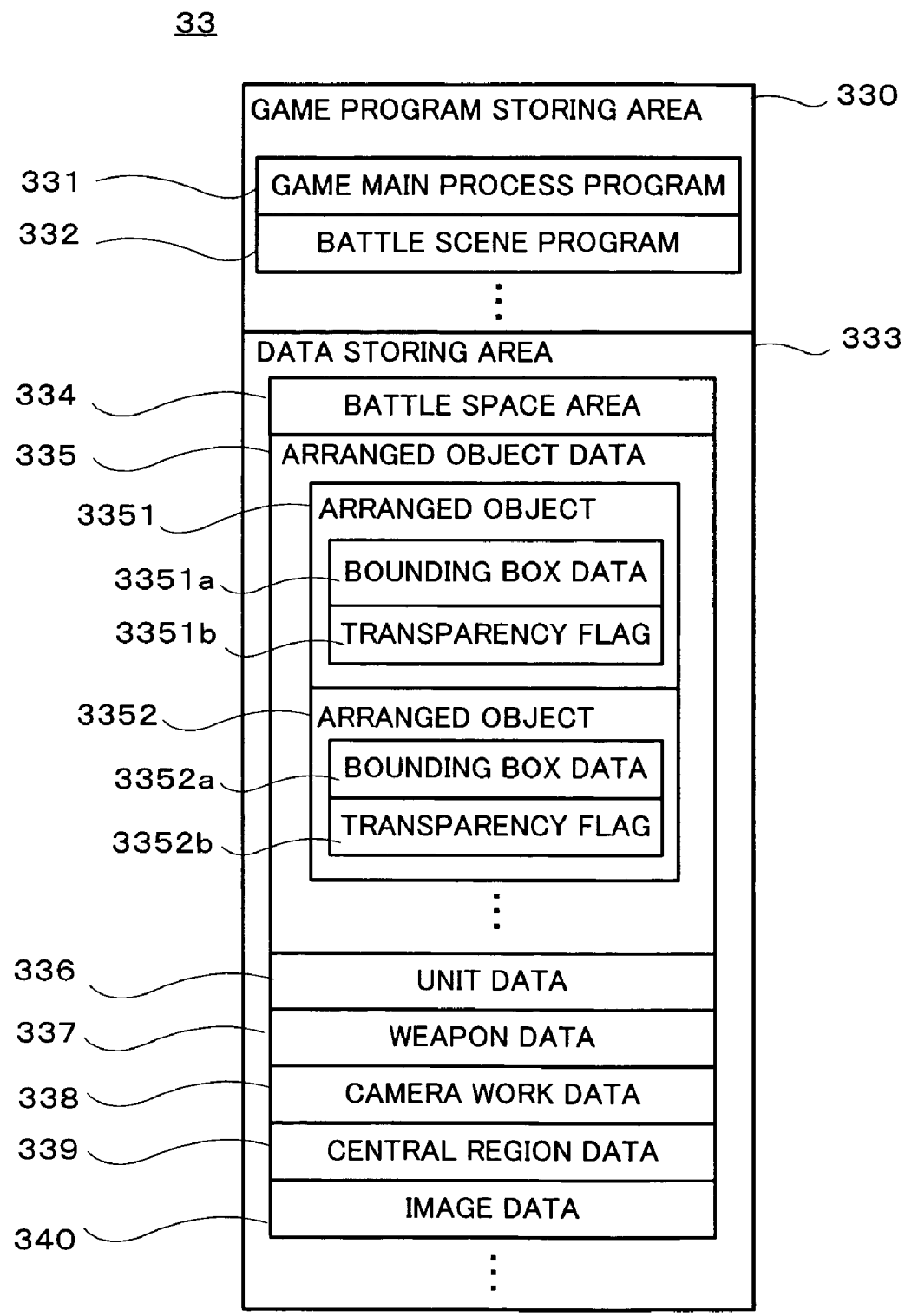
FIG. 16 is a diagram illustrating a memory map of a main memory 33 of FIG. 2.

Next, various pieces of data used in this embodiment will be described. FIG. 16 is a diagram illustrating a memory map of the main memory 33 of FIG. 2. In FIG. 2, the main memory 33 includes a game program storing area 330 and a data storing area 333.

The game program storing area 330 stores a game program which is executed by the CPU 30. The game program includes a game main process program 331, a battle scene program 332, and the like.

The game main process program 331 is a program for controlling the whole process of this embodiment. The battle scene program 332 is a program for displaying a battle scene as described above.

In the data storing area 333, battle space data 334, arranged object data 335, unit data 336, weapon data 337, camera work data 338, central region data 339, image data 340, and the like are stored. Note that, in the main memory 33, data required for the game process, such as data (map screen data, etc.) about other objects appearing the game, data (topographic data, etc.) about the virtual game space, and the like, are stored in addition to the data included in the information of FIG. 16.

The battle space data 334 includes information about an object (hereinafter referred to as an arranged object) arranged in a battle space (information about what arranged object is placed at what position in the battle space), and information about background, BGM or the like. Here, a content of the battle space varies depending on a place on the map screen where a unit which provokes a battle is located. For example, when a unit provokes a battle in a place which is set as a "forest" on the map screen, a background imaging the "forest" is displaced in the battle space, and an object (arranged object) which can provide a "forest" atmosphere to the player, such as a "tree" or the like, is also placed. In the case of a "street", an object (arranged object) which can allow the player to recognize that a battle is conducted on a street, such as a "house", a "shop" or the like, is placed.

The arranged object data 335 includes data of at least one arranged object placed in the battle space. Data of one arranged object (e.g., an arranged object 3351) includes bounding box data 3351a indicating coordinates of vertices or the like of the bounding box, and a transparency flag 3351b which is used in a process described below. In addition, polygon model data of each object, such as a "tree", a "house" or the like, is included.

The unit data 336 is data of various units appearing in the game, and includes polygon model data of each unit, and unit parameters, such as hit points (HP), attack power and the like.

The weapon data 337 is data about weapons which are used in a battle scene, and includes polygon model data of each weapon, and weapon parameters, such as attack power, the number of times of use, and the like.

The camera work data 338 is data about how to move the virtual camera in a battle scene as described above. Specifically, the data defines at what position and in what direction the battle scene is shot in each frame. As described above, the camera work data 338 includes a plurality of pieces of data corresponding to unit types and combinations of weapons used in the battle scene.

The central region data 339 is data about a position and a size in the screen coordinate system of the central region 111 described above with reference to FIG. 11.

The image data 340 is image data (texture data) about the arranged object data 335, the unit data 336, the weapon data 337, a background object, and the like.

Figure 17:
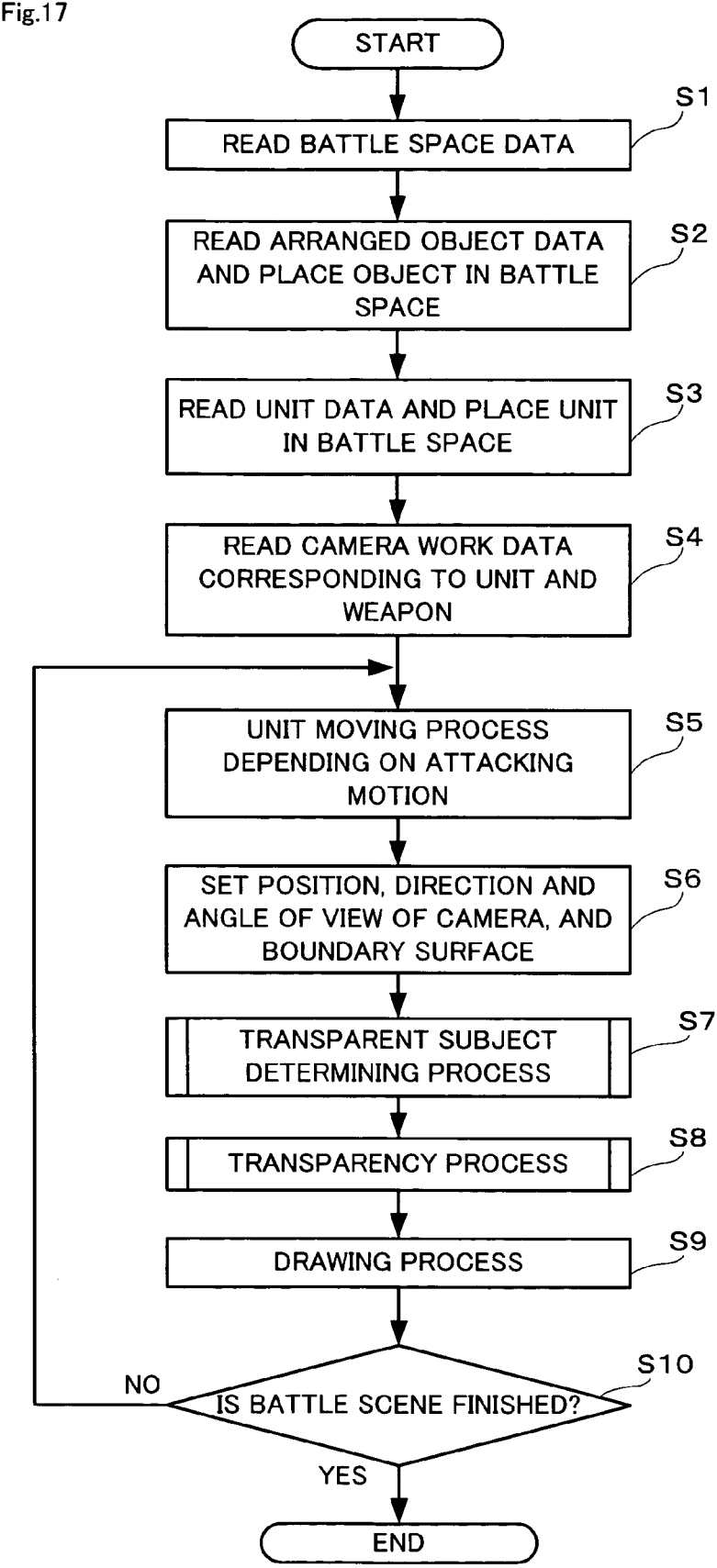
FIG. 17 is a flowchart of a game process according to an embodiment of the present invention.

Next, a game process which is executed by the game apparatus 3 will be described with respect to FIGS. 17 to 19. When the game apparatus 3 is powered ON, the CPU 30 of the game apparatus 3 executes a startup program stored in a boot ROM (not shown) to initialize each unit, such as a main memory 33 and the like. Thereafter, a game program stored on the optical disc 4 is read into the main memory 33, and execution of the game program is started. As a result, a game image is displayed via the GPU 12 on the monitor 2, so that a game is started. FIG. 17 is a flowchart of a game process performed after the game image is changed to a battle scene. Specifically, after the start of the game, when a command "battle" is issued to a player unit on a map screen, calculation of a result of a battle is performed earlier, and the process of the flowchart of FIG. 17 is performed so that the result is displayed as a game image (a battle scene). In other words, the battle scene is a screen which reproduces the battle result. Note that, in this embodiment, game processes for situations other than battle scenes are not directly involved with the present invention, and will not be described. A process loop of steps S5 to S10 of FIG. 17 is repeated on a frame-by-frame basis.

In FIG. 17, initially, the CPU 30 reads the battle space data 334, depending on a position (topography) on the map screen of a unit which performed a battle (step S1). For example, when the battle was performed in a "forest", battle space data for the "forest" is read. In this case, the central region data 339 which is the data about the central region 111 described with reference to FIG. 11 is also read.

Next, the CPU 30 reads the required arranged object data 335 based on the battle space data read in step S1, and arranges required arranged objects in the battle space (step S2). In this case, based on bounding box data included in the data of each arranged object, a bounding box for the arranged object is set (note that the bounding box is not displayed on the screen). The arranged objects are assigned respective IDs which can be uniquely identified.

Next, the CPU 30 reads the unit data 336 and the weapon data 337 of the unit which performed the battle, and places the unit holding a weapon (precisely, a polygon model thereof) in the battle space (step S3).

Next, the CPU 30 reads the camera work data 338, depending on the unit which performed the battle and a weapon which was used by the unit (step S4).

Next, the CPU 30 causes the unit to conduct an action based on the calculated battle result (step S5). Specifically, a pose of the unit is changed as appropriate and a position of the unit is moved so that a motion is displayed based on the battle result (e.g., when the weapon is a sword, an attack motion is displayed in which the unit jumps on and cuts the enemy unit).

Next, the CPU 30 sets a position, a direction, an angle of view, and the like of the virtual camera based on the camera work data 338 read in step S4 (step S6). In this case, a boundary surface (see FIG. 10) which is perpendicular to a line of sight of the virtual camera is set at a predetermined distance in a depth direction from a near clip surface of the virtual camera as described above.

Next, the CPU 30 performs a transparency subject determination process of determining whether or not a transparency process is performed with respect to each of the arranged objects (step S7). In this process, as described above, it is determined whether or not an arranged object is positioned within a predetermined distance (i.e., closer to the player than the boundary surface is) with respect to the near clip surface of the virtual camera. Further, it is determined whether or not the arranged object is positioned in the vicinity of the center of the screen. Thereby, it is determined whether or not each arranged object in the battle space is to be subjected to the transparency process.

Figure 18:
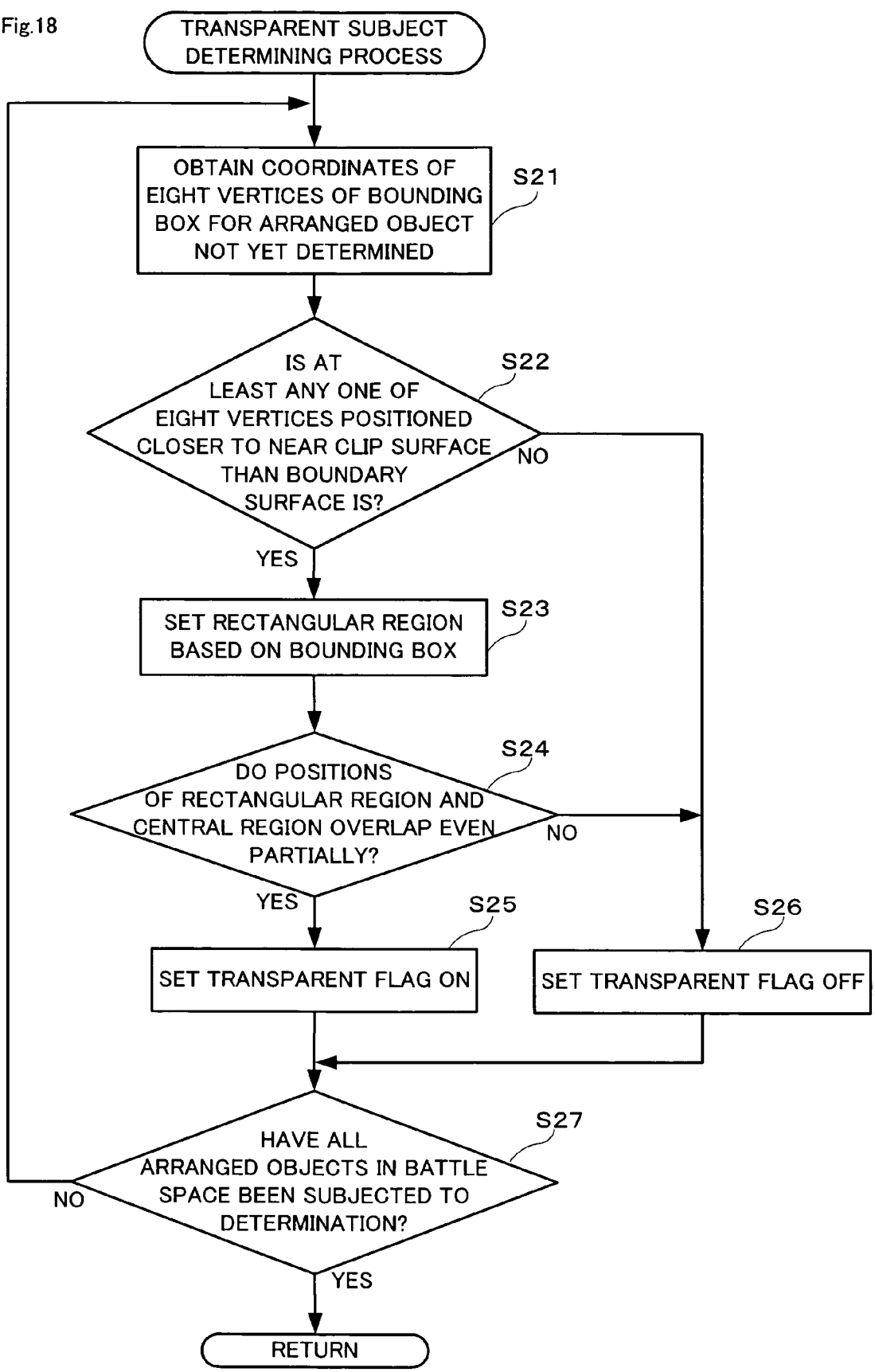
FIG. 18 is a flowchart showing details of a transparency subject determination process of step S7 of FIG. 17.
Figure 19:
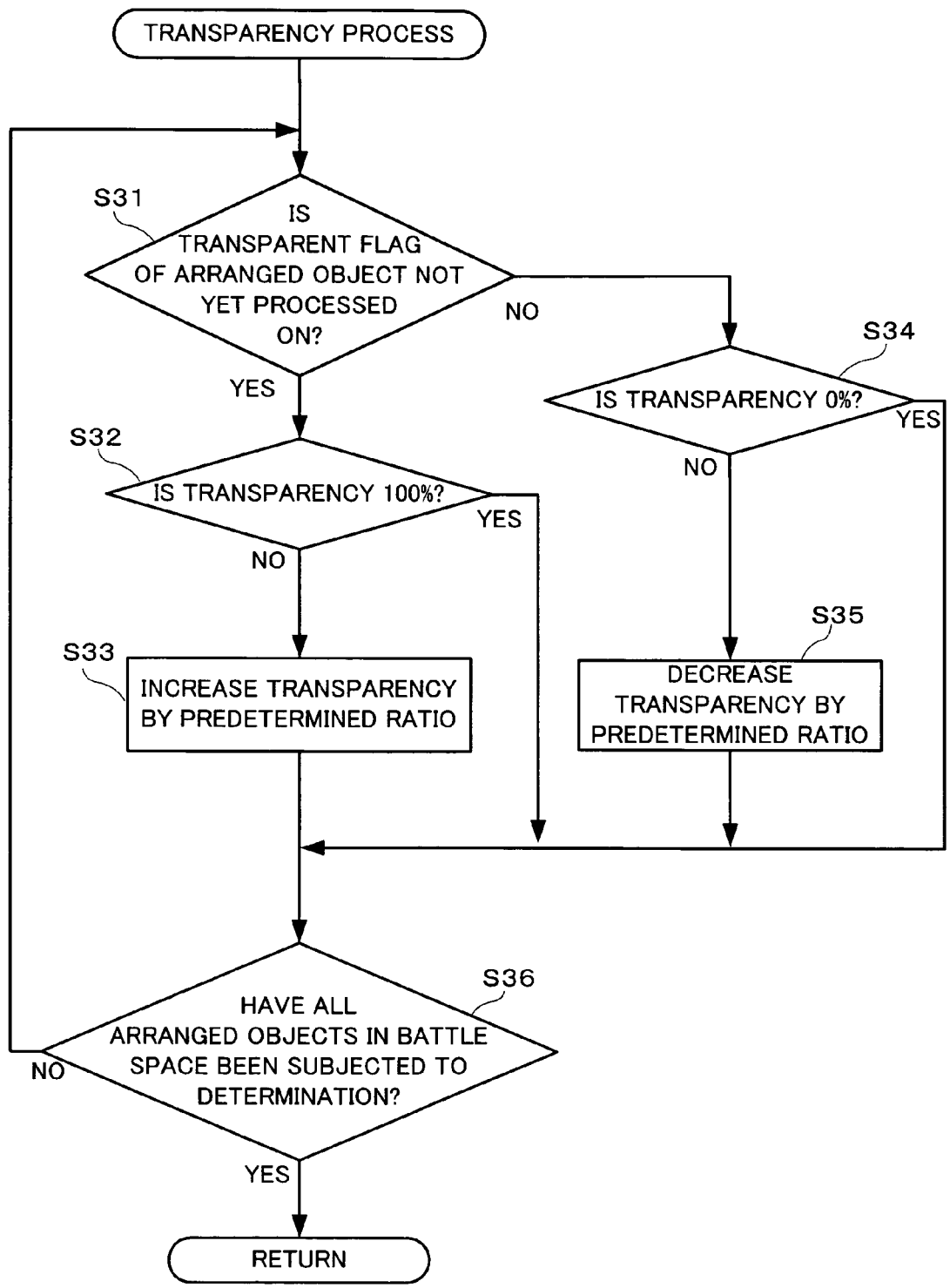
FIG. 19 is a flowchart showing details of a transparency process in step S8 of FIG. 17.

FIG. 18 is a flowchart showing details of the transparency subject determination process of step S7. In FIG. 18, initially, the CPU 30 selects one from arranged objects which have not yet been determined as to whether to be subjected to the transparency process, and obtains coordinates of the eight vertices of a bounding box set for the selected arranged object (step S21). It is here assumed that the arranged object 3351 of FIG. 16 is selected.

Next, the CPU 30 determines whether or not at least any one of the eight vertices exceeds the boundary surface (step S22). Specifically, in a camera coordinate system in which a position of the virtual camera is an origin and a line-of-sight direction (a shooting direction of the virtual camera) is the positive direction of the Z axis, if at least any one of the eight vertices has a Z-axis coordinate value which is less than the Z-axis coordinate value of the boundary surface, it is determined that the arranged object 3351 is within the predetermined distance. If all of the eight vertices each have a Z-axis coordinate value which is larger than that of the boundary surface, it is determined that the arranged object 3351 is not within the predetermined distance.

As a result of the determination in step S22, when the arranged object 3351 is not positioned closer to the virtual camera than the boundary surface is (NO in step S22), the CPU 30 causes the process to go to step S26 described below.

On the other hand, when the arranged object 3351 exceeds the boundary surface and is positioned closer to the virtual camera (YES in step S22), the CPU 30 subjects the battle space to the perspective transformation to temporarily generate a two-dimensional working image (here, at least the bounding box is drawn). Thereafter, based on the coordinates of the eight vertices of the bounding box for the arranged object 3351 in the two-dimensional image, the rectangular region 121 (see FIG. 12) which completely covers the bounding box in the two-dimensional image is determined, and information indicating a position of the rectangular region 121 is stored into any memory area of the main memory 33 (step S23).

Next, the CPU 30 sets the central region 111 in the two-dimensional image based on the central region data 339 read in step S1. Thereafter, the CPU 30 determines whether or not the central region 111 and the rectangular region 121 overlap each other (see FIG. 13), based on information about the positions of the two regions (step S24). As a result of the determination, when the two regions do not overlap each other (NO in step S24), the transparency flag 3351*b* of the arranged object 3351 corresponding to the rectangular region 121 is set to be OFF (step S26). On the other hand, when the two regions overlap each other (YES in step S24), the transparency flag 3351*b* of the arranged object 3351 is set to be ON (step S25).

Next, the CPU 30 determines whether or not all of the arranged objects in the battle space have been subjected to the processes of steps S21 to S26 (step S27). As a result of the determination, when there is an arranged object remaining not yet processed (NO in step S27), the CPU 30 returns to step S21 and repeats the process of step 21. On the other hand, when the above-described processes have been finished for all of the arranged objects (YES in step S27), the transparency subject determination process is ended.

Next, referring back to FIG. 17, the CPU 30 performs the transparency process of causing the arranged object to actually become transparent (step S8). FIG. 19 is a flowchart showing details of the transparency process in step S8. In FIG. 19, initially, the CPU 30 selects one to be processed from arranged objects which have not yet been subjected to the transparency process, and determines whether or not the transparency flag of the selected arranged object is ON (step S31). For the sake of convenience, it is also here assumed that the arranged object 3351 of FIG. 16 is selected. As a result of the determination, when the transparency flag 3351*b* is ON (YES in step S31), then it is determined whether or not the transparency of the arranged object 3351 is 100% (i.e., completely transparent) (step S32). Specifically, it is determined whether or not an alpha value (a parameter indicating the transparency; not shown) which is one of parameters set in the arranged object 3351 is 0. As a result of the determination, when the alpha value is 0 (i.e., the transparency is 100%) (YES in step S32), the CPU 30 causes the process to go to step S36 described below. On the other hand, when the alpha value is not 0 (i.e., the transparency is not 100%), the CPU 30 reduces the alpha value of the arranged object 3351 (more precisely, the alpha values of pixels constituting the arranged object 3351) by a predetermined value (step S33). In other words, the transparency is increased. Thereafter, the CPU 30 causes the process to go to step S36.

On the other hand, as a result of the determination in step S31, when the transparency flag 3351*b* of the selected arranged object 3351 is not ON (NO in step S31), the CPU 30 determines whether or not the transparency of the arranged object 3351 is 0% (i.e., completely opaque) (step S34). This is a process in which, when the result of a camera work shows that an object which has been caused to be temporarily transparent is shifted to a position deeper than the boundary surface (a position which does not obstruct the sight of the player), the transparent object is returned to its original state (opaque state). Specifically, in step S34, it is determined whether or not the alpha value is 255. As a result of the determination, when the alpha value is 255 (i.e., the transparency is 0%) (YES in step S34), the CPU 30 causes the process to go to step S36 described below. On the other hand, when the alpha value is not 255 (i.e., the transparency is not 0%), the CPU 30 increases the alpha value of the arranged object 3351 by a predetermined value (step S35). In other words, the transparency is reduced. Thereafter, the CPU 30 causes the process to go to step S36.

Next, the CPU 30 determines whether or not all of the arranged objects in the battle space have been subjected to the processes of steps S31 to S35 (step S36). As a result of the determination, when there is an arranged object remaining not yet processed (NO in step S36), the CPU 30 returns to step S31 and repeats the process of step S31. On the other hand, when the above-described processes have been finished for all of the arranged objects (YES in step S36), the transparency process is ended.

Referring back to FIG. 17, when the transparency process of step S8 is ended, then the CPU 30 performs a drawing process for displaying the battle space on the screen (step S9) Specifically, an image is generated by shooting the battle space using the virtual camera, and the image is processed and displayed as a game image on the monitor 2. As a result, an image reflecting the result of the transparency process is displayed on the screen. After step S9, it is determined in step S10 whether or not the battle scene is ended. When the result of the determination is YES, the game process is ended. When the result of the determination is NO, the CPU 30 returns to step S5 and repeats the game process. Note that the end of the battle scene is determined based on, for example, whether or not the process loop has been repeated the number of times corresponding to the number of frames which are previously defined for the battle scene.

As described above, in this embodiment, when there is an object within a predetermined distance from a virtual camera (a point of view) in a virtual space, the object is caused to gradually become transparent on a frame-by-frame basis. Thereby, it is possible to prevent the player from feeling awkward or unnatural due to sudden disappearance of an obstacle obstructing the sight of the player. Particularly, as is different from the conventional art in which the transparency is changed depending on the distance, the transparency is changed every a unit time. Therefore, even if an obstacle suddenly appears before eyes (a position at a distance between the near clip surface and 0), the obstacle is prevented from suddenly disappearing, and it can be expressed that the obstacle is caused to gradually become transparent.

Also, for example, when a game developer defines a camera work of a virtual camera, it is possible to reduce the effort to design the camera work while taking the presence of an obstacle into consideration. Also, when an object comes within a predetermined distance from the virtual camera, the object is not immediately caused to become transparent. In this case, only when the object is positioned in the vicinity of the center of the screen in the screen coordinate system, the object is caused to become transparent. Therefore, only an obstacle which obstructs the sight of the player can be efficiently caused to become transparent. Also, a simple 3D model called a bounding box is provided for each object, and the coordinates of the eight vertices are used to calculate whether or not each object is present within a predetermined distance from the virtual camera. Therefore, even when the object has a complicated shape composed of a large number of polygons, it is possible to determine whether or not the object is to be subjected to the transparency process, by performing only relatively simple calculation, thereby reducing the processing load of the CPU.

Although a battle scene in an SRPG has been described as an example in the above-described embodiment, scenes which require the transparency process as described above are not limited to SRPG battle scenes. The above-described process can be applied to any games in which a virtual game space is displayed in 3D, such as an action game, a racing game, and the like.

Although the positions and sizes of the bounding box 91 and the central region 111 are previously prepared as data in the above embodiment (i.e., the data is loaded from the optical disc 4 to the main memory 33 during execution of a game process), the present invention is not limited to this. The CPU 30 may calculate the positions and sizes of the bounding box 91 and the central region 111 during the start of execution of a game process or as required.

Although the shape of the bounding box has been described as a hexahedral shape as an example in the above embodiment, the bounding box shape is not limited to this. For example, the shape of the bounding box may be spherical. Note that the bounding box shape is preferably simple in view of the processing load. When the bounding box is in the shape of a sphere, it may be determined whether or not the boundary surface is present within the radius of the sphere, instead of using the above-described eight vertices to determine whether or not an object exceeds the boundary surface. Thereby, the processing load can be reduced. Note that, when the CPU 30 has a sufficient level of processing performance, it may be determined whether or not an object is close to a virtual camera, without using a bounding box (i.e., the coordinates of the vertices of each of polygons constituting the object may be used).

Although the position of the central region 111 is set in a predetermined region including the center of a screen in the above-described embodiment, the present invention is not limited to this. The position of the central region 111 may be set in any region excluding the screen center (e.g., a left- or right-end region of the screen, etc.). In this case, if only an object present close to an end of the screen is subjected to the transparency process, and an object present in the center portion of the screen is not subjected to the transparency process, the view of the center portion of the screen is obstructed, thereby making it possible to increase the difficulty of a game.

Although the boundary surface is a flat surface in the above-described examples, the present invention is not limited to this. The boundary surface may be a curved surface or the like. In this case, a distance from the near clip surface to the boundary surface can be changed, depending on the position on the screen. For example, the boundary surface can be set so that the distance from the near clip surface to the boundary surface is maximum at a central position of the screen, and decreases with distance from the central position of the screen.

In the above-described embodiment, the position and the like of the virtual camera are changed on a frame-by-frame basis by performing a camera work. The present invention is not limited to this. The position of the virtual camera may be fixed, and an object may be moved as appropriate. Thereby, it can be expressed as if the virtual camera itself were moved. In this case, as described above, when an object moves and exceeds the boundary surface, the object may be caused to become transparent.

While the invention has been described in detail, the foregoing description is in all aspects illustrative and not restrictive. It is understood that numerous other modifications and variations can be devised without departing from the scope of the invention.

What is claimed is:

1. A storage medium storing a game program for displaying on a screen of a display device a virtual image obtained when at least one object present in a virtual space is observed from a predetermined point of view in the virtual space, the game program causing a computer of a game apparatus to execute:

a relative position changing step of changing a relative position of each object with respect to the point of view by changing at least one of information indicating a position of the point of view and information indicating a position of the object, the pieces of information being stored in a storage means of the game apparatus;

a distance determining step of determining whether or not a distance from the point of view to each object in the virtual space is smaller than or equal to a predetermined distance, with reference to the information indicating the point of view and the information indicating the position of the object;

a transparency changing step of changing, every a unit time, information indicating a transparency of an object whose distance is determined in the distance determining step to be smaller than or equal to the predetermined distance, so that the transparency of the object is gradually increased, the information indicating the transparency of the object being stored in the storage means of the game apparatus; and a drawing step of drawing a virtual image including the object with reference to the information indicating the transparency.

2. The storage medium according to claim 1, wherein:

the distance determining step includes determining whether or not at least a portion of a bounding region for each object, the bounding region enclosing the object, is positioned closer to the point of view than a boundary surface is, the boundary surface being set at a predetermined distance from the point of view and being perpendicular to a line of sight from the point of view; and the transparency changing step includes updating, every a unit time, a value indicating the transparency of an object for which it is determined in the distance determining step that at least a portion of the bounding region is closer to the point of view than the boundary surface is, so that the transparency of the object is gradually increased.

3. The storage medium according to claim 2, wherein:

the bounding region is in the shape of a hexahedron having eight vertices; and the distance determining step includes determining that the distance of an object is smaller than or equal to the predetermined distance when at least one of the eight vertices of the bounding region for the object is closer to the point of view than the boundary surface is.

4. The storage medium according to claim 1, wherein:

the game program causes the computer to further execute:

a central display determining step of determining whether or not at least a portion of an object present at the predetermined distance or less from the point of view is displayed within a predetermined range including a center of a two-dimensional image obtained by subjecting the virtual space including the object to perspective transformation using the point of view as a reference; and the transparency changing step includes updating, every a unit time, information indicating the transparency of only an object which is determined in the central display determining step that at least a portion thereof is displayed within the predetermined range including the center of the two-dimensional image.

5. The storage medium according to claim 4, wherein the predetermined range including the center of the two-dimensional image used in the determination of the central display determining step is a rectangular region.

6. The storage medium according to claim 5, wherein:

the game program causes the computer to further execute:

an object region setting step of setting an object region which is a rectangular region enclosing an object present at the predetermined distance or less from the point of view, in the two-dimensional image; and the central display determining step includes determining that the object for which the object region is set is displayed in the predetermined range including the center of the two-dimensional image when at least a portion of the object region overlaps the predetermined range including the center of the two-dimensional image.

7. The storage medium according to claim 1, wherein the transparency changing step includes updating, every a unit time, the information indicating the transparency of the object so that an opacity of the object is increased, when, after updating the information indicating the transparency, it is determined in the distance determining step that the distance of the object for which the information indicating the transparency has been updated is not smaller than or equal to the predetermined distance.

8. A game apparatus for displaying on a screen of a display device a virtual image obtained when at least one object present in a virtual space is observed from a predetermined point of view in the virtual space, the game apparatus comprising:

a storage section;

a relative position changing section for changing a relative position of each object with respect to the point of view by changing at least one of information indicating a position of the point of view and information indicating a position of the object, the pieces of information being stored in a storage section;

a distance determining section for determining, every a unit time, whether or not a distance from the point of view to each object in the virtual space is smaller than or equal to a predetermined distance, with reference to the information indicating the point of view or the information indicating the position of the object;

a transparency changing section for changing, every a unit time, information indicating a transparency of an object whose distance is determined by the distance determining section to be smaller than or equal to the predetermined distance, so that the transparency of the object is gradually increased, the information indicating the transparency of the object being stored in the storage section; and a drawing section for drawing a virtual image including the object with reference to the information indicating the transparency.

* * * * *